(12) United States Patent
Furukawa et al.

(10) Patent No.: US 10,666,170 B2
(45) Date of Patent: May 26, 2020

(54) FAILURE DETERMINATION DEVICE FOR ANGLE DETECTOR OF ROTATING MACHINE AND FAILURE DETERMINATION METHOD

(71) Applicant: Mitsubishi Electric Corporation, Tokyo (JP)

(72) Inventors: Akira Furukawa, Tokyo (JP); Yu Kawano, Tokyo (JP); Munenori Yamamoto, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/081,547

(22) PCT Filed: Apr. 28, 2016

(86) PCT No.: PCT/JP2016/063359
§ 371 (c)(1),
(2) Date: Aug. 31, 2018

(87) PCT Pub. No.: WO2017/187600
PCT Pub. Date: Nov. 2, 2017

(65) Prior Publication Data
US 2019/0074780 A1 Mar. 7, 2019

(51) Int. Cl.
*H02P 6/16* (2016.01)
*H02P 6/12* (2006.01)
(Continued)

(52) U.S. Cl.
CPC ............... *H02P 6/12* (2013.01); *G01D 5/12* (2013.01); *G01D 5/24457* (2013.01); *H02P 6/16* (2013.01); *H02P 29/0241* (2016.02)

(58) Field of Classification Search
CPC ..... G01D 5/24457; H02P 29/0241; H02P 6/12; H02P 6/16
See application file for complete search history.

(56) References Cited

FOREIGN PATENT DOCUMENTS

EP 2752645 A2 * 7/2014 ............... G01D 3/08
EP 2752645 A2 7/2014
(Continued)

OTHER PUBLICATIONS

International Search Report for PCT/JP2016/063359 dated Aug. 2, 2016.
(Continued)

*Primary Examiner* — Muhammad S Islam
(74) *Attorney, Agent, or Firm* — Sughrue Mion, PLLC; Richard C. Turner

(57) ABSTRACT

A failure determination device for an angle detector for a rotating machine, including: an angle detector, which includes n pole pairs (n>m), and outputs sine and cosine wave-signals in accordance with a rotational position of a rotating machine including a multi-phase winding and m pole pairs (m≥2); and a failure determiner for detecting failure of the detector based on signals from the detector. The detector outputs first and second sine-wave-signals having 180° phases different, and first and second cosine-wave-signals having 180° phases different. The failure determiner determines malfunction of the detector when the failure is determined with use of at least one of: failure determination using a sum of the first and second sine-wave-signals and a sum of the first and second cosine-wave-signals; or failure determination using a sum of squares or a square root of a sum of squares of the sine-wave-signal and the cosine-wave-signal.

12 Claims, 13 Drawing Sheets

(51) Int. Cl.
*G01D 5/12* (2006.01)
*H02P 29/024* (2016.01)
*G01D 5/244* (2006.01)

(56) References Cited

FOREIGN PATENT DOCUMENTS

| | | |
|---|---|---|
| JP | 2005-049097 A | 2/2005 |
| JP | 5011824 B2 | 8/2012 |

OTHER PUBLICATIONS

Communication from the European Patent Office dated Mar. 29, 2019, an Extended European Search Report in counterpart European Application No. 16900470.2.

* cited by examiner

FAILURE DETERMINATION DEVICE FOR ANGLE DETECTOR OF ROTATING MACHINE AND FAILURE DETERMINATION METHOD

CROSS REFERENCE TO RELATED APPLICATIONS

This application is a National Stage of International Application No. PCT/JP2016/063359 filed Apr. 28, 2016.

TECHNICAL FIELD

The present invention relates to a failure determination device for an angle detector for a rotating machine, an angle detection device for a rotating machine, and a failure determination method for an angle detector for a rotating machine.

BACKGROUND ART

For example, a related-art abnormality determination device of Patent Literature 1 determines that a rotation angle detection device is abnormal when a square root of a sum of squares of a sine wave signal and a cosine wave signal is outside of a predetermined range.

Further, a failure detection circuit of Patent Literature 2 determines abnormality when a value obtained by adding a signal +sin θ and a signal −sin θ or a value obtained by adding a signal +cos θ and a signal −cos θ exceeds a threshold value.

CITATION LIST

Patent Literature

[PTL 1] JP 5011824 B2
[PTL 2] JP 2005-49097 A

SUMMARY OF INVENTION

Technical Problem

However, in the above-mentioned abnormality determination device of Patent Literature 1, erroneous detection or missed detection of the failure may occur when the number of pole pairs of the rotating machine is larger than the number of pole pairs of the angle detector.

Further, in the above-mentioned failure detection circuit of Patent Literature 2, abnormality cannot be detected when no change occurs in the value obtained by adding the signals.

The present invention has been made to solve the above-mentioned problems, and has an object to provide, for example, a failure determination device and method for an angle detector for a rotating machine, which are capable of obtaining, even when the number m of pole pairs of the rotating machine is larger than the number n of pole pairs of the angle detector, a failure detection accuracy that is equivalent to that in a case of m=n.

Solution to Problem

According to one embodiment of the present invention, there is provided a failure determination device for an angle detector for a rotating machine, the failure determination device including: an angle detector, which includes n pole pairs (n is a natural number that is smaller than m), and is configured to output a sine wave signal and a cosine wave signal in accordance with a rotational position of a rotating machine including a multi-phase winding and m pole pairs (m is a natural number of 2 or more); and a failure determiner configured to determine failure of the angle detector based on signals from the angle detector, wherein the angle detector is configured to output the sine wave signal including a first sine wave signal and a second sine wave signal having a phase that is different by 180° from a phase of the first sine wave signal, and the cosine wave signal including a first cosine wave signal and a second cosine wave signal having a phase that is different by 180° from a phase of the first cosine wave signal, and wherein the failure determiner is configured to determine that the angle detector is out of order when the failure is determined with use of at least one of: first failure determination using a sum of the first sine wave signal and the second sine wave signal and a sum of the first cosine wave signal and the second cosine wave signal; or second failure determination using a sum of squares or a square root of a sum of squares of the sine wave signal and the cosine wave signal.

Advantageous Effects of Invention

According to one embodiment of the present invention, it is possible to provide, for example, the failure determination device and method for an angle detector for a rotating machine, which are capable of obtaining, even when the number m of pole pairs of the rotating machine is larger than the number n of pole pairs of the angle detector, a failure detection accuracy that is equivalent to that in the case of m=n.

DESCRIPTION OF EMBODIMENTS

First, the above-mentioned related art is described in more detail.

Figure 22:
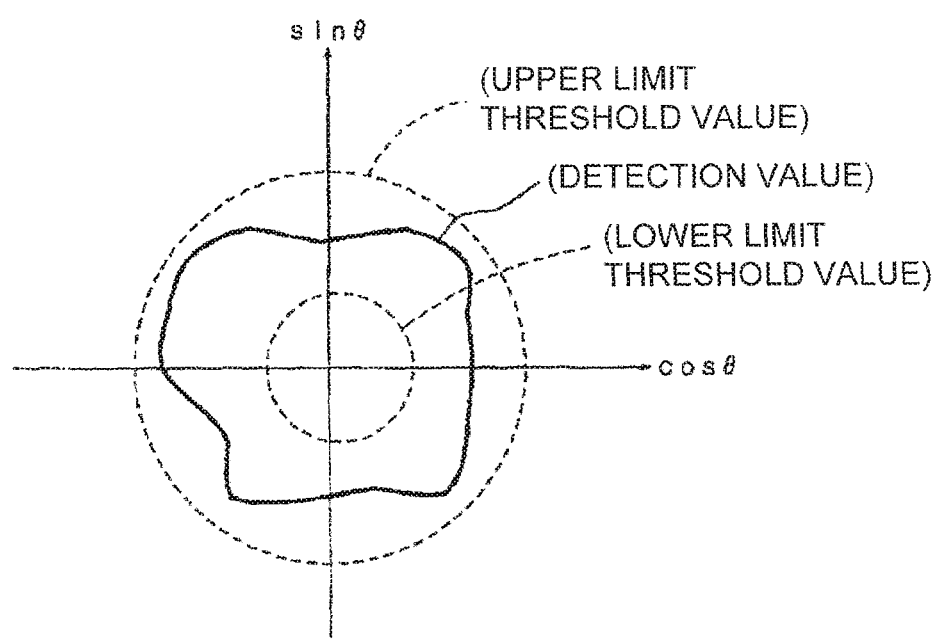
FIG. 22 is a graph for showing abnormality determination for an angle detector in the related art (cited from FIG. 2 of Patent Literature 1).
Figure 23:
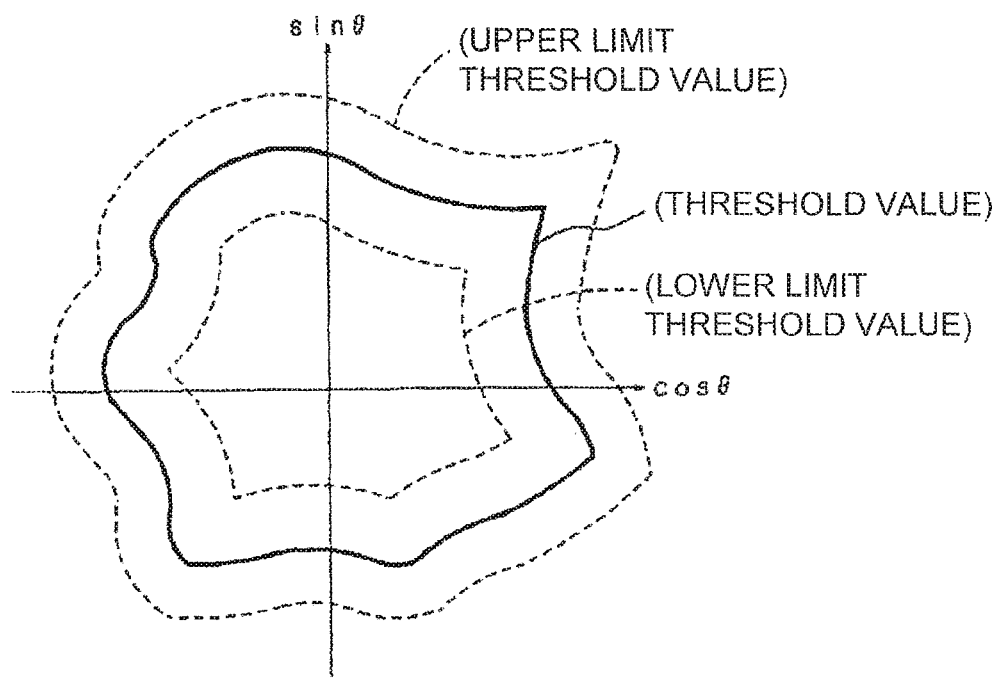
FIG. 23 is a graph for showing abnormality determination for the angle detector in the related art (cited from FIG. 6 of Patent Literature 1).

In the above-mentioned abnormality determination device of Patent Literature 1, based on a square root of a sum of squares of a sine wave signal and a cosine wave signal, a normal state is determined when the square root of the sum of the squares of the detection values is within a range between an upper limit threshold value and a lower limit threshold value, and abnormality is determined when the square root of the sum of the squares of the detection values is outside of the region. When there is no error component, the upper and lower limit threshold values as shown in FIG. 22, which is cited from Patent Literature 1, are obtained. Further, when there is an error component, the upper and lower limit threshold values as shown in FIG. 23, which is cited from Patent Literature 1, are obtained because the square root of the sum of the squares varies depending on an angle. A region for normal determination is desired to be narrowed in order to reliably detect the failure, but sine wave signals and cosine wave signals, which are the output of the rotation angle detection device, change in characteristic due to, for example, temperature change and secular change. Therefore, a margin is required to be provided between the upper limit threshold value and the lower limit threshold value in anticipation of the characteristic change.

Description is given of a case in which a rotation angle detection device having n pole pairs is mounted to a rotating machine having m pole pairs. A direction of an output torque is reversed when an electrical angle is deviated from a true value by 90° or more. An angle error allowed in the rotation angle detection device at that time is less than $(90 \text{ n/m})°$. When m=n is satisfied, the angle error is only required to be less than 90°, and hence the upper and lower limit threshold values may be set in a range of ±100% with respect to a center value.

Figure 24:
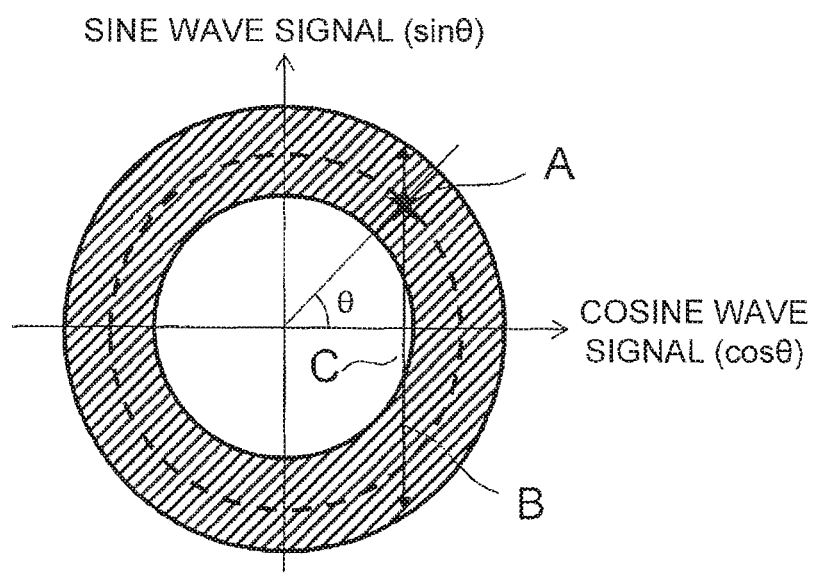
FIG. 24 is a graph for showing abnormality determination for the angle detector in the related art.

The rotating machine is often multi-polarized in order to increase the output torque. Meanwhile, the number of pole pairs of the rotation angle detection device is often reduced in order to facilitate correction of an error. Description is given of a case of, for example, m=5 and n=1. In Patent Literature 1, a normal state is determined at a hatched portion, which is a portion between the upper and lower limit values as shown in FIG. 24, and failure is determined at other portions. A radius of the inner circle represents the lower limit threshold value, and a radius of the outer circle represents the upper limit threshold value. A black star A represents a state immediately before failure. When abnormality occurs in the sine wave signal, the sine wave signal changes in a range of an arrow B. The range of the arrow B has a portion that extends outside of the hatching portion, which is represented by symbol C, and failure is determined in this region.

Figure 25:
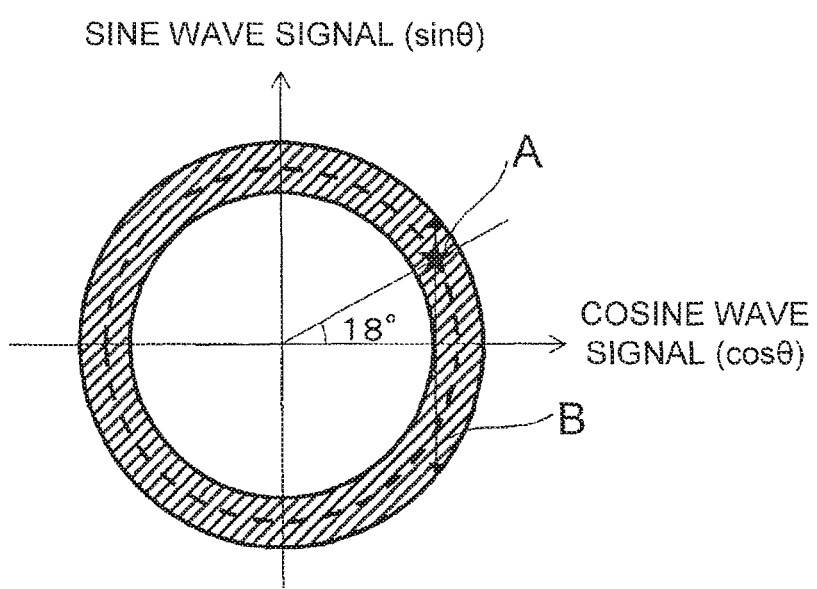
FIG. 25 is a graph for showing abnormality determination for the angle detector in the related art.

The rotating machine outputs a reverse-direction torque when the error of the electrical angle exceeds 90°, and hence the failure determination for the angle detector is required to be executed before that situation. When the number m of pole pairs of the rotating machine is 5 and the number n of pole pairs of the angle detector is 1, an electrical angle of 90° corresponds to 18° as a rotation angle obtained from the angle detector. That is, the failure determination for the angle detector is required to be executed before the error exceeds 18°. A case in which failure occurs at 18° as shown in FIG. 25 is considered. Failure cannot be determined unless the range of the arrow B passes the inside of the inner circle. Therefore, the lower limit threshold value is required to be set to a value that is larger than a value obtained by multiplying the square root of the sum of the squares at the time of the normal state by COS 18°. That is, 4.9%)(=1−COS 18° is allowed as variations of the square root of the sum of the squares.

The increase or decrease of the amplitude of the angle detector is required to be suppressed within 4.9% in order to enable failure detection, but the sine wave signals and the cosine wave signals change in offset, amplitude, and the like depending on temperature. Therefore, in an inexpensive angle detector, it is difficult to suppress the amount of increase or decrease of the amplitude caused by the temperature change within this range. That is, when the number m of pole pairs of the rotating machine is larger than the number n of pole pairs of the angle detector, erroneous detection or missed detection of the failure may be caused in the failure detection method of Patent Literature 1.

The failure detection circuit of Patent Literature 2 determines abnormality when a value obtained by adding a signal +sin θ and a signal −sin θ or a value obtained by adding a signal +cos θ and a signal −cos θ exceeds a threshold value. The failure detection circuit utilizes the fact that each signal is a sine wave signal using a midpoint voltage (Vcc/2) as a reference. Therefore, when there is no change in value obtained by adding the signals, for example, when the signal +sin θ and the signal −sin θ are adjacent pins and are fixed in the vicinity of Vcc/2, the abnormality cannot be detected.

According to the present invention, even when the number m of pole pairs of the rotating machine is larger than the number n of pole pairs of the angle detector, by determining failure with use of first failure determination using a sum of sine wave signals having phases opposite to each other and a sum of cosine wave signals having phases opposite to each other and second failure determination using a sum of squares or a square root of a sum of squares of the sine wave signal and the cosine wave signal, a failure detection accuracy that is equivalent to that in the case of m=n can be obtained.

Now, a failure determination device and method for an angle detector for a rotating machine according to the present invention are described with reference to the drawings by way of embodiments. In the embodiments, like or corresponding parts are denoted by like symbols, and redundant description is omitted.

First Embodiment

Figure 1:
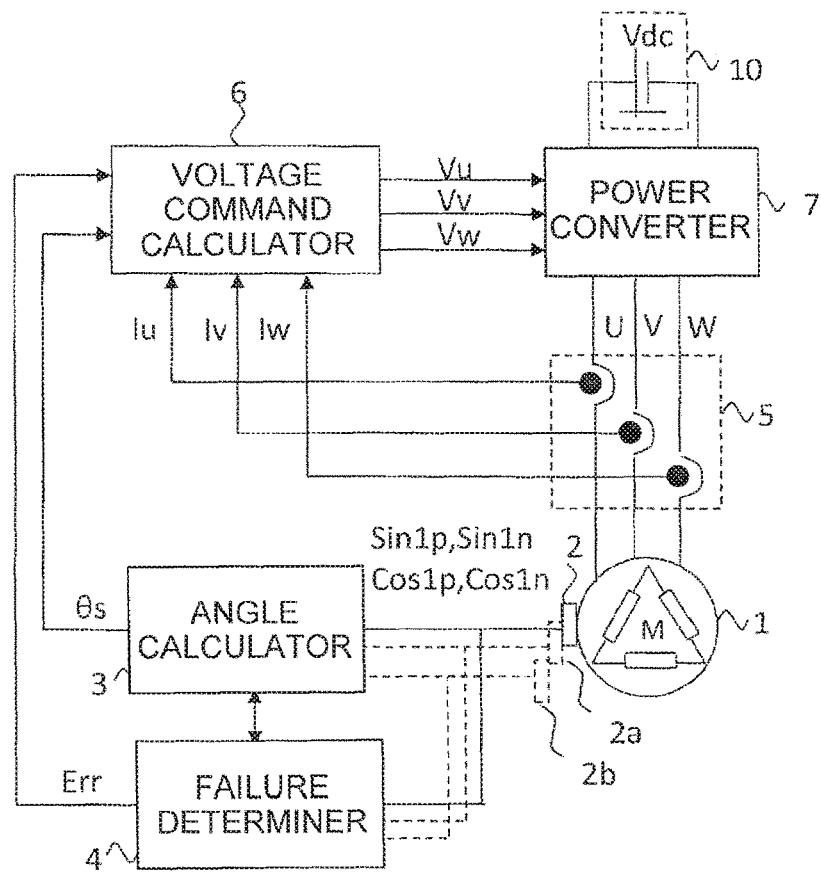
FIG. 1 is a diagram for illustrating an example of an overall configuration of a rotating machine provided with, for example, a failure determination device for an angle detector for a rotating machine according to the present invention, and a control system for the rotating machine.

FIG. 1 is a diagram for illustrating an example of an overall configuration of a rotating machine provided with the failure determination device for an angle detector for a rotating machine according to the present invention, and a control system for the rotating machine.

In FIG. 1, the rotating machine 1 is, for example, a permanent-magnet synchronous rotating machine including a multi-phase winding formed of three-phase windings U, V, and W. In the present invention, description is given of a case in which the rotating machine 1 is a permanent-magnet synchronous rotating machine, but the rotating machine 1 may be a wound-field synchronous rotating machine.

Description is given below of the rotating machine 1 having the number m of pole pairs of 5 as an example, but similar effects can be obtained even when the rotating machine 1 has other numbers of pole pairs as long as the number m is a natural number of 2 or more.

A DC power supply 10 outputs a DC voltage Vdc to a power converter 7 to be described later. The DC power supply 10 may be any device as long as the device outputs a DC voltage, and may be, for example, a battery, a DC-DC converter, a diode rectifier, or a PWM rectifier.

Figure 2:
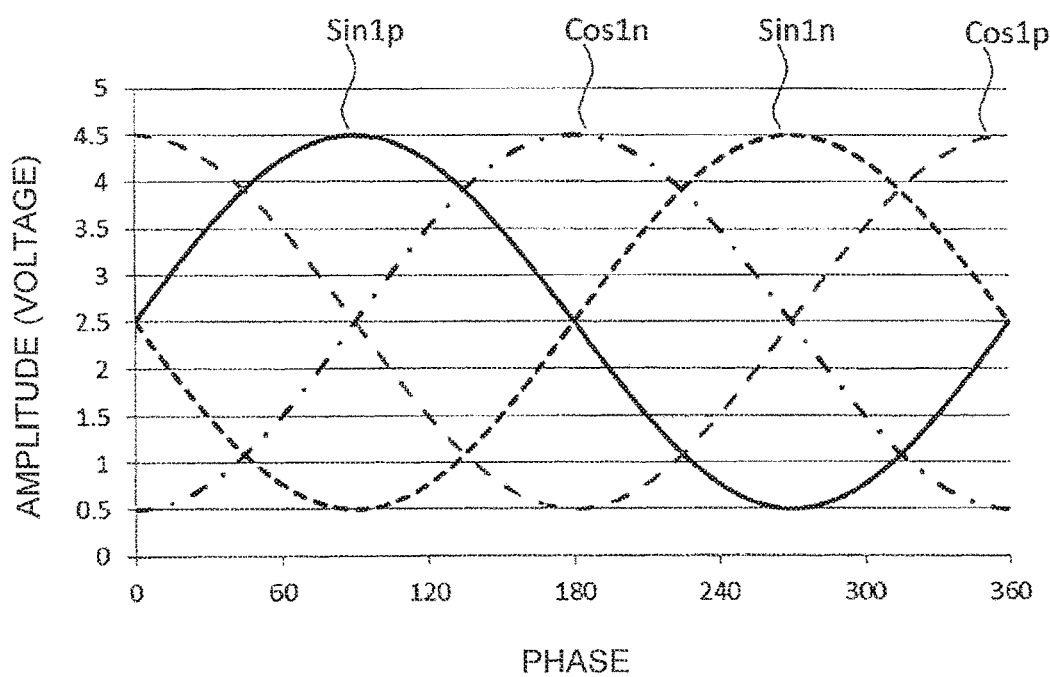
FIG. 2 is a graph for showing output signals of an angle detector for a failure determination device according to a first embodiment of the present invention.

An angle detector 2 is a position detector, for example, a Hall element, a TMR element, or a GMR element. In order to obtain a rotational position of the rotating machine 1, the angle detector 2 outputs sine wave signals (Sin 1p and Sin 1n) and cosine wave signals (Cos 1p and Cos 1n) as shown in FIG. 2 in accordance with the rotational position of the rotating machine 1. The sine wave signals include:

a sine wave signal 1 (Sin 1p) being a first sine wave signal; and a sine wave signal 2 (Sin 1n) being a second sine wave signal having a phase different by 180° from that of the sine wave signal 1. The cosine wave signals include:

a cosine wave signal 1 (Cos 1p) being a first cosine wave signal; and a cosine wave signal 2 (Cos 1n) being a second cosine wave signal having a phase different by 180° from that of the cosine wave signal 1. Description is given of the angle detector 2 having the number n of pole pairs of 1 as an example, but similar effects can be obtained even when the angle detector 2 has other numbers of pole pairs as long as the number n is a natural number that is smaller than m excluding 0.

Figure 18:
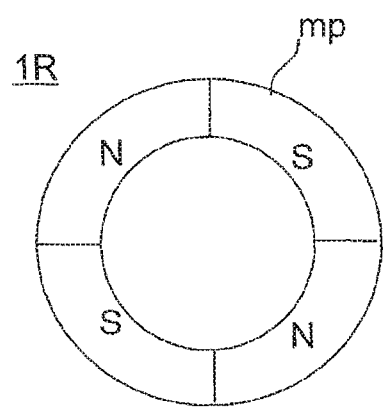
FIG. 18 is a view for illustrating the number of pole pairs of the rotating machine.

The number m of pole pairs of the rotating machine 1 refers to, for example, the number of pole pairs of magnetic poles mp of a rotator 1R of the rotating machine 1 illustrated in FIG. 18. The number m of pole pairs in this case is 2.

Figure 19:
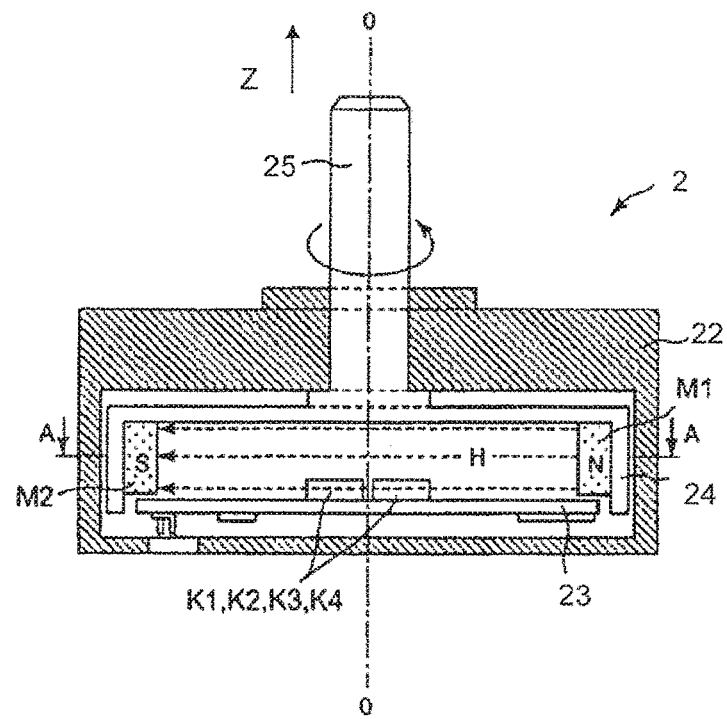
FIG. 19 is a view for illustrating the number of pole pairs of the angle detector (cited from FIG. 1 of Patent Literature 2).

The angle detector 2 includes, for example, as illustrated in the longitudinal sectional view of FIG. 19, inside a case 22, a flat-plate-shaped support member (stationary portion) 23 fixed to the case 22, and a cup-shaped rotation member 24 positioned above the support member 23. At the center of the rotation member 24, a rotary shaft 25 extending in a Z-axis direction to the outside of the case 22 along a center line 0-0 is fixed, and the rotation member 24 is supported rotatably about the rotary shaft 25. The rotation of the rotating machine 1 is transmitted to the rotary shaft 25.

Magnets M1 and M2 are fixed to an inner wall of the rotation member 24. The magnets M1 and M2 are magnetized so that the N-pole and the S-pole are divided at surfaces opposed to each other. A direction connecting between the N-pole and the S-pole corresponds to a radial direction. In FIG. 19, a magnetic field H extending from the magnet M1 corresponding to the N-pole toward the magnet M2 corresponding to the S-pole is indicated by the dotted line, and the direction of the magnetic field H changes along with the rotation of the rotation member 24.

Figure 20:
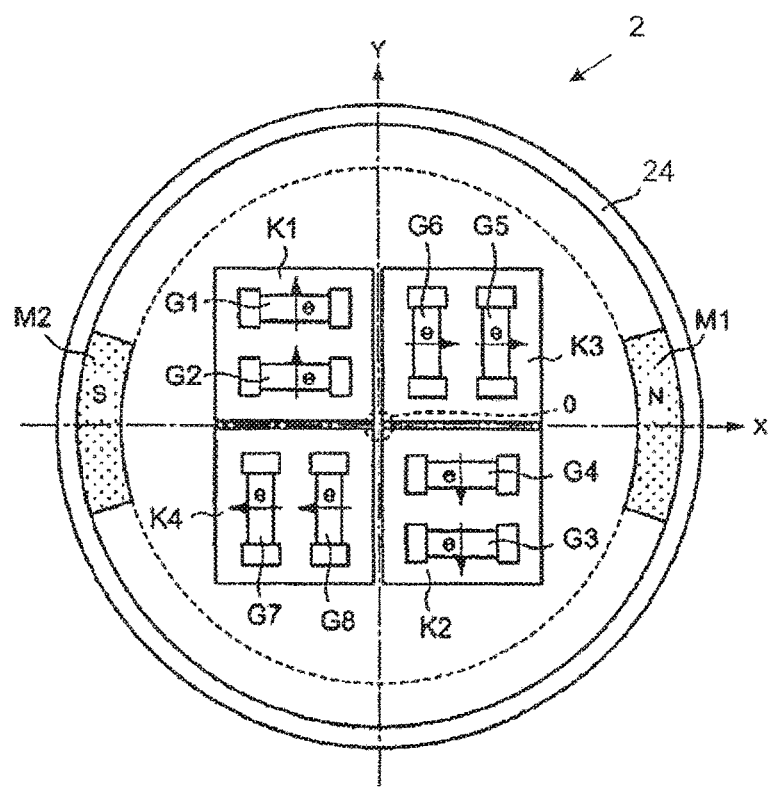
FIG. 20 is a view for illustrating the number of pole pairs of the angle detector (cited from FIG. 2 of Patent Literature 2).

On the support member 23, for example, four substrates K1, K2, K3, and K4 as illustrated in FIG. 20, which is a plan view taken along the line A-A of FIG. 19, are provided around the center axis 0-0. Pairs of magneto-resistive effect elements G1 to G8 are provided on the respective substrates. That is, the magneto-resistive effect elements G1 and G2 are provided on the substrate K1, the magneto-resistive effect elements G3 and G4 are provided on the substrate K2, the magneto-resistive effect elements G5 and G6 are provided on the substrate K3, and the magneto-resistive effect elements G7 and G8 are provided on the substrate K4. Around the center axis 0-0, the substrate K1 and the substrate K2 are provided so as to be symmetric with respect to the axis, and the substrate K3 and the substrate K4 are provided so as to be symmetric with respect to the axis. The arrows given to the respective magneto-resistive effect elements G1 to G8 indicate a direction e of magnetization of a fixed magnetic layer forming the magneto-resistive effect element.

The substrates K1, K2, K3, and K4 are provided on the inner side of the magnets M1 and M2 of the rotation member 24. When the magnets M1 and M2 are rotated together with the rotation member 24 around the substrates K1, K2, K3, and K4, a direction of magnetization of a free magnetic layer forming each of the magneto-resistive effect elements G1 to G8 changes in accordance with the direction of the magnetic field H formed between the rotating magnets M1 and M2.

Resistances R1 to R8 among the impedance components of the magneto-resistive effect elements G1 to G8 are decreased when the direction of the magnetization of the free magnetic layer matches the direction e of the magnetization of the fixed magnetic layer, and are increased when the direction of the magnetization of the free magnetic layer is opposite to the direction e of the magnetization of the fixed magnetic layer. When the rotation angle is represented by θs, the resistances R1 to R8 can be obtained as a sin θs function or a cos θs function that uses θs as a variable.

In this case, the magnetic field H is detected with use of a magnetic field generated by the two opposing magnets, but the present invention is not limited to the configuration of FIG. 19. It is only required to provide a configuration capable of generating a magnetic field crossing the magneto-resistive effect element, the Hall element, or other elements. For example, a magnetic field generated by a disc-shaped magnet mounted to the leading end of the rotary shaft 25 may be used.

Further, the number n of pole pairs of the angle detector 2 refers to the number of pairs of the magnets M1 and M2. In this case, the number n of pole pairs is 1.

An angle calculator 3 generates the rotation angle θs of the rotating machine 1 based on the sine wave signals and the cosine wave signals obtained from the angle detector 2. For example, the rotation angle θs can be calculated as Expression (1), A midpoint voltage of the sine wave signal 1 and a midpoint voltage of the sine wave signal 2 are substantially equal to each other. Therefore, by subtracting the sine wave signal 2 from the sine wave signal 1, a sine wave (Sin_diff1) having substantially 0 V as the midpoint voltage can be obtained.

A midpoint voltage of the cosine wave signal 1 and a midpoint voltage of the cosine wave signal 2 are substantially equal to each other. Therefore, by subtracting the cosine wave signal 2 from the cosine wave signal 1, a cosine wave (Cos_diff1) having substantially 0 V as the midpoint voltage can be obtained.

Then, the rotation angle θs is calculated with use of the signals obtained through the subtraction based on arctan {(Sin_diff1)/(Cos_diff1)}. Thus, a rotation primary angle error can be reduced. In this case, a method of calculating the rotation angle θs with use of Expression (1) is described as an example, but an angle error caused by an offset, amplitude, and a phase difference may be reduced with use of a known method.

$$\begin{cases} \theta_s = \arctan\left(\dfrac{\text{Sin\_diff1}}{\text{Cos\_diff1}}\right) \\ \text{Sin\_diff1} = \text{Sin}1p - \text{Sin}1n \\ \text{Cos\_diff1} = \text{Cos}1p - \text{Cos}1n \end{cases} \quad (1)$$

A failure determiner 4 generates failure information Err based on the sine wave signals (Sin 1p and Sin 1n) and the cosine wave signals (Cos 1p and Cos 1n) obtained from the angle detector 2. The failure determiner 4 includes:

failure determination 1 using a sum of the sine wave signal 1 and the sine wave signal 2 and a sum of the cosine wave signal 1 and the cosine wave signal 2; and failure determination 2 using a sum of squares or a square root of a sum of squares of the sine wave signal and the cosine wave signal. Details are described later.

A current detector 5 obtains detection currents Iu, Iv, and Iw with use of current detectors such as shunt resistors and Hall elements. A case in which currents are detected for all of the three phases is described here, but a part or all of the currents may be obtained through estimation.

A voltage command calculator 6 calculates voltage commands Vu, Vv, and Vw for driving the rotating machine 1, and outputs the voltage commands Vu, Vv, and Vw to the power converter 7. As a method of calculating the voltage commands Vu, Vv, and Vw, there is employed current feed-back control in which a current command for the rotating machine 1 is set as a control command, and the voltage commands Vu, Vv, and Vw are calculated through proportional-integral control based on a deviation between the current command and detection currents Iu, Iv, and Iw output from the current detector 5 so as to make the deviation equal to zero.

In the power converter 7, a pulse width modulation circuit (not shown) performs pulse width modulation (PWM modulation) based on the voltage commands Vu, Vv, and Vw output from the voltage command calculator 6 to generate switching signals having pulse widths corresponding to the voltage commands Vu, Vv, and Vw. A switching circuit (similarly not shown) turns on or off a semiconductor switch based on the generated switching signals to subject the DC voltage Vdc input from the DC power supply 10 to power conversion to apply voltages to the three-phase windings U, V, and W of the rotating machine 1. As the switching element, a switch obtained by connecting a semiconductor switch such as an IGBT, a bipolar transistor, or a MOS power transistor and a free-wheeling diode in antiparallel is used. When PWM modulation is performed, the supply voltage is fixed because of the DC voltage Vdc. Therefore, various known modulation methods are used to improve the voltage utilization factor.

Figure 21:
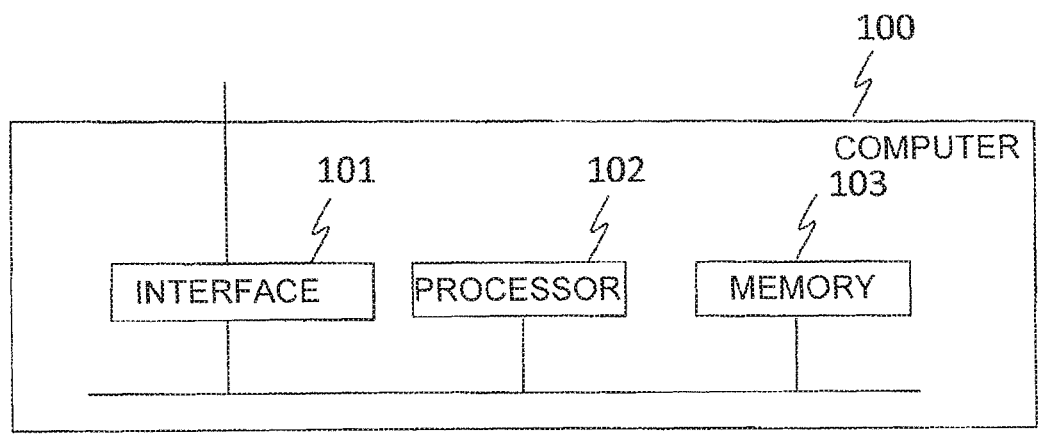
FIG. 21 is a schematic block diagram of a computer in a case in which a main part of the failure determination device according to the present invention is formed of a computer.

The angle calculator 3, the failure determiner 4, further, the voltage command calculator 6, and still further, the pulse width modulation circuit of the power converter 7 can be formed of one computer, for example. An example of a schematic configuration of the computer in this case is illustrated in FIG. 21. Input or output of input signals from the angle detector 2 and the current detector 5 and an output signal to the power converter 7 is performed via an interface 101. In a memory 103, programs of various functions for control to be described later and information, data, or the like required for processing are to be stored or stored in advance. A processor 102 subjects the signal input via the interface 101 to calculation processing in accordance with the various programs, information, and data stored in the memory 103 to output the processing results via the interface 101.

Further, the angle calculator 3, the failure determiner 4, and the voltage command calculator 6 may be formed of one digital circuit, or may be each formed of a digital circuit.

Now, the failure determiner 4, which is a characteristic part of the present invention, is described in detail.

Figure 3:
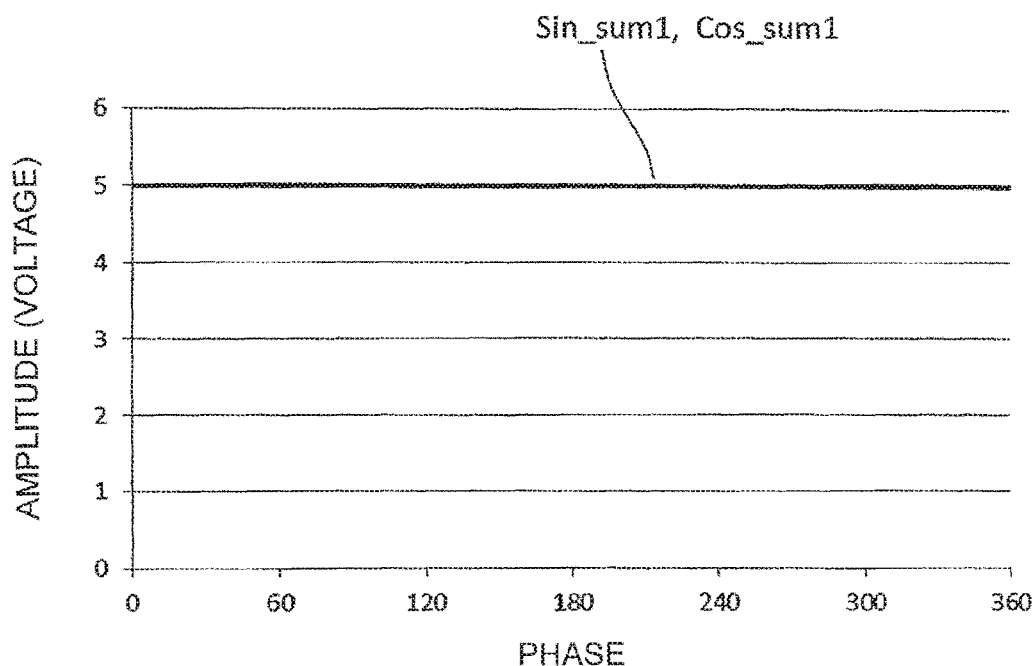
FIG. 3 is a graph for showing a sum signal of sine wave signals having a phase difference of 180° and a sum signal of cosine wave signals having a phase difference of 180° in a failure determiner of the failure determination device according to the first embodiment of the present invention.

The sine wave signal 1 and the sine wave signal 2 have a phase difference of 180°, and hence a sum signal (Sin_sum1) of the two signals is ideally twice the midpoint voltage (2.5 V), specifically, 5 V as shown in FIG. 3.

Similarly, the cosine wave signal 1 and the cosine wave signal 2 have a phase difference of 180°, and hence a sum signal (Cos_sum1) of the two signals is ideally twice the midpoint voltage.

When any one of the four signals is deviated from the true value due to failure, Sin_sum1 or Cos_sum1 is deviated from twice the midpoint voltage.

In the failure determination 1 corresponding to the first failure determination, failure is determined based on this deviation amount. The above-mentioned sum of the two signals is slightly fluctuated from twice the midpoint voltage due to circuit variations, temperature change, secular change, and the like, and hence a width is required to be provided as threshold values for the failure determination.

Figure 4:
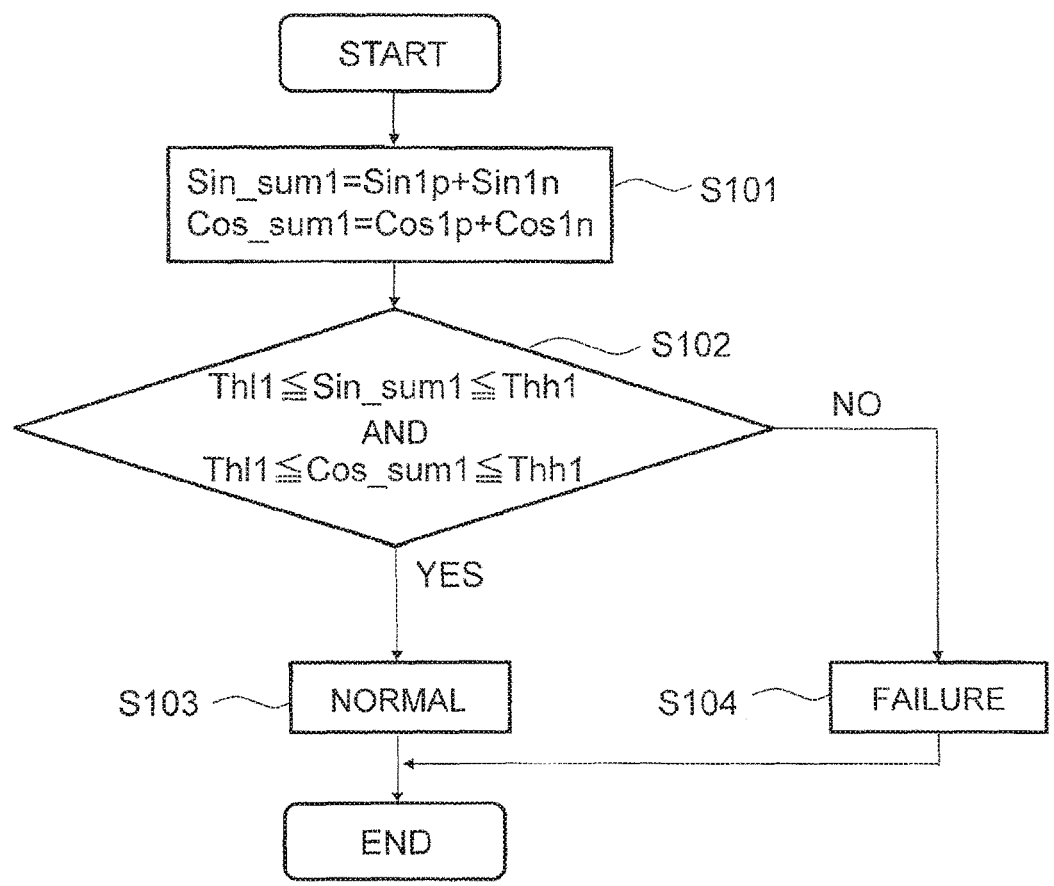
FIG. 4 is a flow chart for illustrating an example of a processing operation of failure determination 1 in the failure determiner of the failure determination device according to the first embodiment of the present invention.

In the failure determination 1, as an example, failure is determined based on the processing illustrated in the flow chart of FIG. 4.

In Step S101, Sin_sum1 and Cos_sum1 are calculated from the sum of the sine wave signals and the sum of the cosine wave signals, respectively.

In Step S102, it is determined whether or not Sin_sum1 is equal to or larger than a lower limit threshold value Thl1 of the failure determination 1 and equal to or smaller than an upper limit threshold value Thh1 of the failure determination 1, and Cos_sum1 is equal to or larger than the lower limit threshold value Thl1 and equal to or smaller than the upper limit threshold value Thh1, provided that Thl1<Thh1.

When the above-mentioned condition is satisfied (YES), the normal state is determined in Step S103, and when the above-mentioned condition is not satisfied (NO), the failure is determined in Step S104.

Various threshold values are set in advance including the values to be described later. For example, the values are stored in the memory 103 of the computer 100 illustrated in FIG. 21 to be used.

Figure 5:
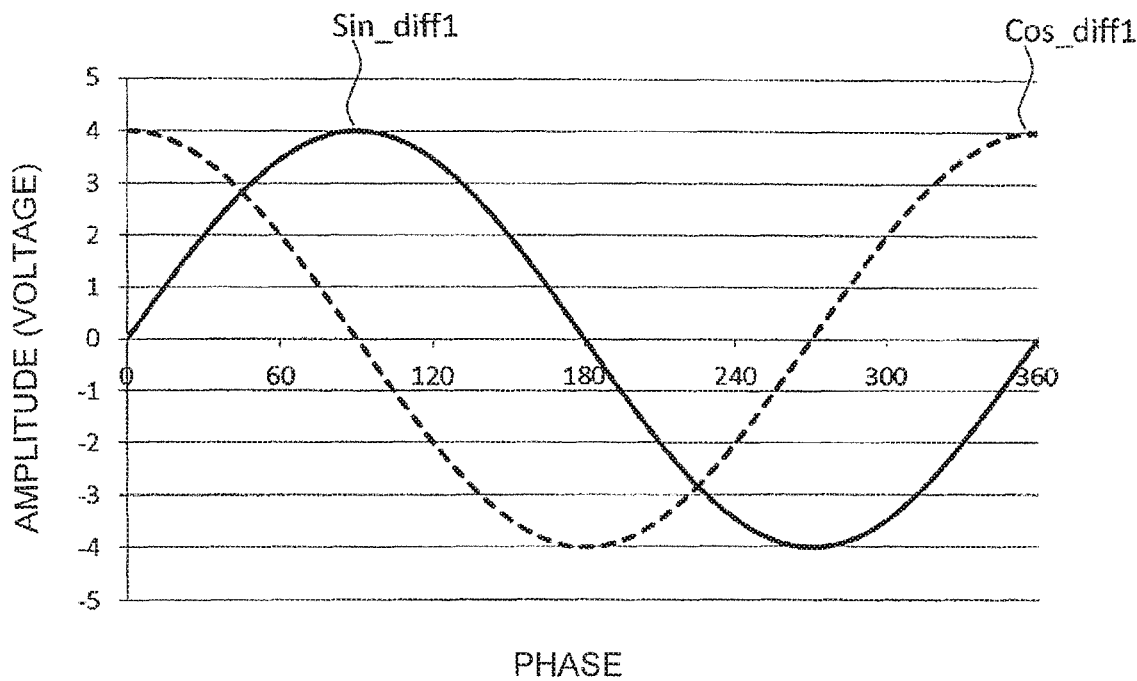
FIG. 5 is a graph for showing a difference signal of sine wave signals having a phase difference of 180° and a difference signal of cosine wave signals having a phase difference of 180° in the failure determiner of the failure determination device according to the first embodiment of the present invention.

The sine wave signal 1 and the sine wave signal 2 have a phase difference of 180° and thus have substantially the same offset voltage. Therefore, when the difference between the sine wave signal 1 and the sine wave signal 2 is used, a difference signal Sin_diff1 with a double amplitude in which the offset voltages are canceled can be obtained as shown in FIG. 5.

The cosine wave signal 1 and the cosine wave signal 2 have a phase difference of 180° and thus have substantially the same offset voltage. Therefore, when the difference between the cosine wave signal 1 and the cosine wave signal 2 is used, a difference signal Cos_diff1 with a double amplitude in which the offset voltages are canceled can be obtained as similarly shown in FIG. 5.

Figure 6:
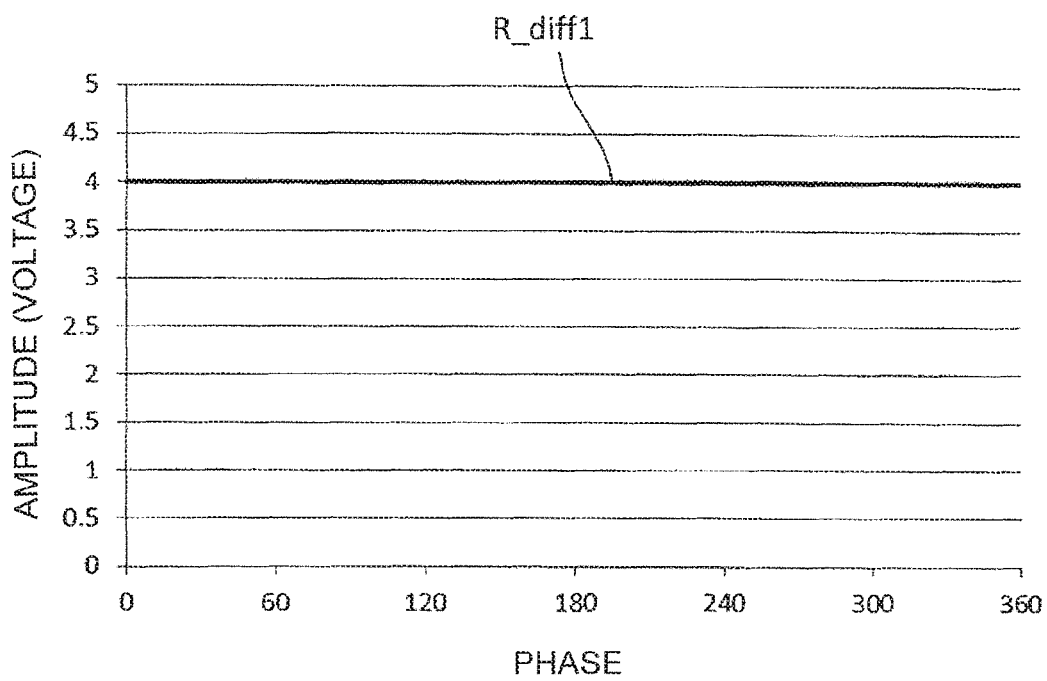
FIG. 6 is a graph for showing a square root R_diff1 of a sum of squares of Sin_diff1 and Cos_diff1 in the failure determiner of the failure determination device according to the first embodiment of the present invention.

At this time, a square root R_diff1 of a sum of squares of Sin_diff1 and Cos_diff1 is ideally constant at twice the amplitude of the sine wave signal 1, and is as shown in FIG. 6.

In the failure determination 2 corresponding to the second failure determination, failure is determined based on this deviation amount from the constant value. The above-mentioned square root R_diff1 of the sum of the squares of the two difference signals is fluctuated from the above-mentioned constant value due to circuit variations, temperature change, secular change, and the like, and hence a width is required to be provided as threshold values for the failure determination.

In the failure determination 2, a normal state is determined when the square root R_diff1 of the sum of the squares is equal to or larger than a lower limit threshold value Thl2 of the failure determination 2 and equal to or smaller than an upper limit threshold value Thh2 of the failure determination 2, and failure is determined when the square root R_diff1 of the sum of the squares is smaller than the lower limit threshold value Thl2 or larger than the upper limit threshold value Thh2.

Figure 8:
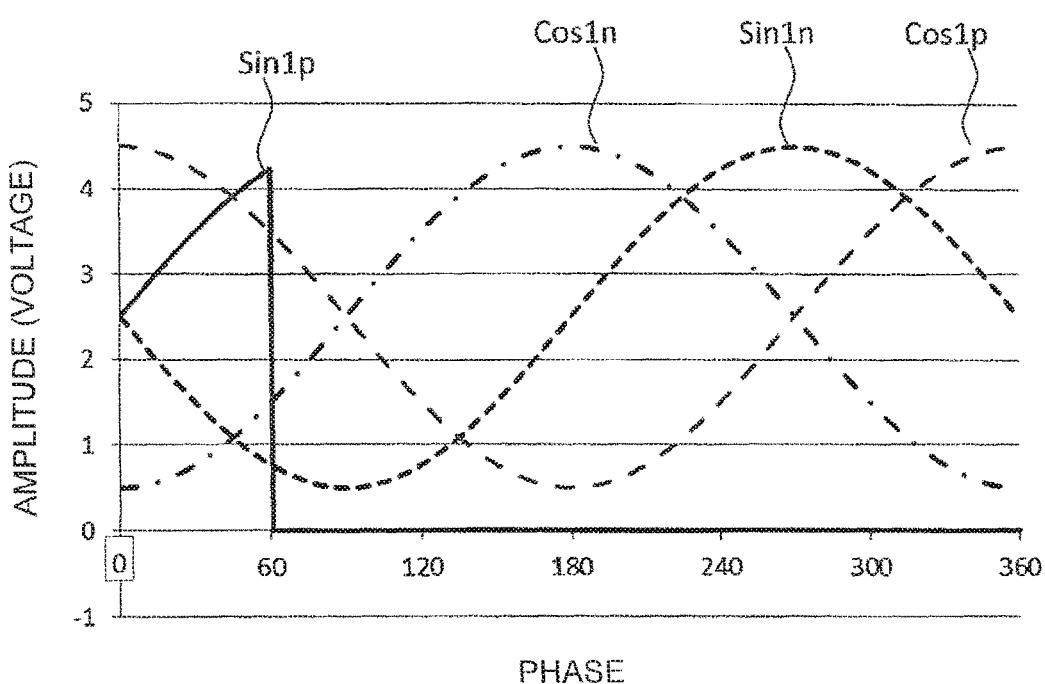
FIG. 8 is a graph for showing signal waveforms of sine wave signals and cosine wave signals at the time when short-to-ground failure occurs in a sine wave signal 1 in failure determination of the failure determination device according to the first embodiment of the present invention.
Figure 9:
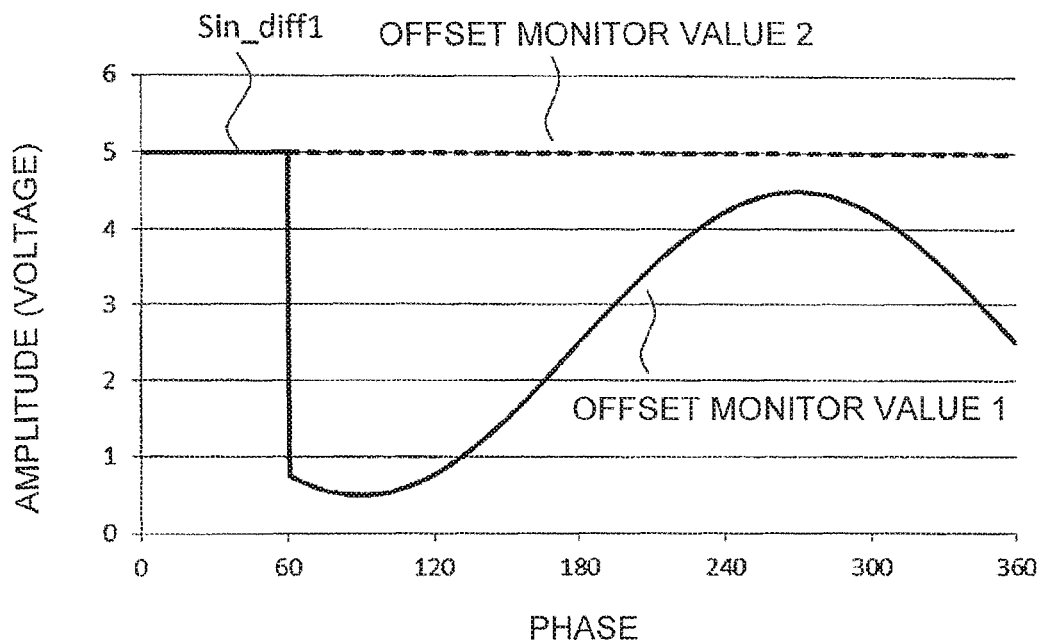
FIG. 9 is a graph for showing a signal waveform of the sum signal at the time when the short-to-ground failure occurs in the sine wave signal 1 in the failure determination of the failure determination device according to the first embodiment of the present invention.

When short-to-ground failure occurs in the sine wave signal 1 (Sin 1p) while the rotating machine 1 is rotating, the sine wave signal 2 and the cosine wave signals 1 and 2 exhibit signal waveforms as shown in FIG. 8. The angle detector 2 normally outputs the sine wave signal 1 until the phase reaches 60°, but the sine wave signal 1 drops to 0 V when the phase exceeds 60°, and this state is maintained as it is. The sum signal Sin_sum1 at this time is as shown in FIG. 9. The sum signal Sin_sum1 is constant at 5 V at the time of the normal state as indicated by an offset monitor value 2, but fluctuates in a range of from 0.5 V to 4.5 V as indicated by an offset monitor value 1 after the failure. Therefore, the failure can be determined with use of the failure determination 1 when the lower limit threshold value Thl1 of the failure determination 1 is set to a value larger than 4.5 V.

Figure 10:
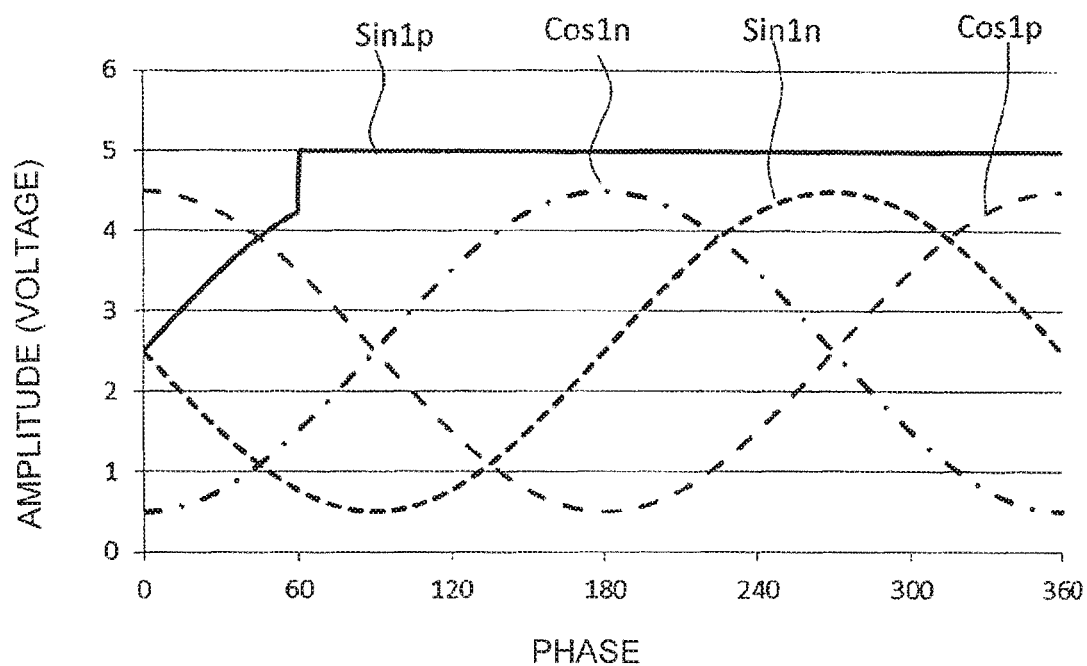
FIG. 10 is a graph for showing signal waveforms of the sine wave signals and the cosine wave signals at the time when short-to-power failure occurs in the sine wave signal 1 in the failure determination of the failure determination device according to the first embodiment of the present invention.
Figure 11:
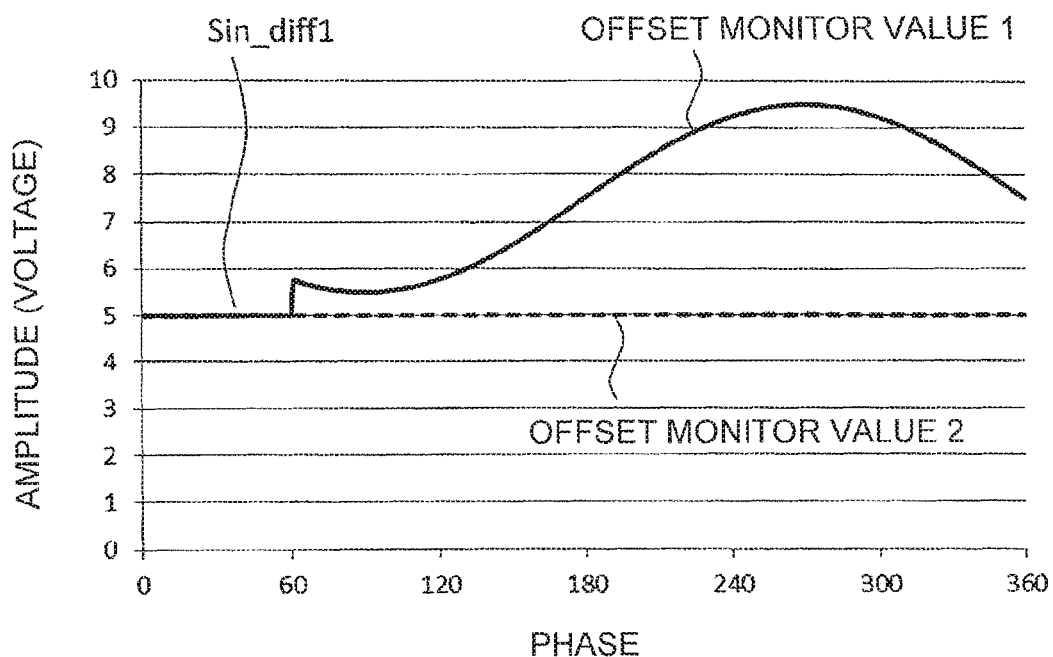
FIG. 11 is a graph for showing a signal waveform of the sum signal at the time when the short-to-power failure occurs in the sine wave signal 1 in the failure determination of the failure determination device according to the first embodiment of the present invention.

When short-to-power failure occurs in the sine wave signal 1 (Sin 1p) while the rotating machine 1 is rotating, the sine wave signal 2 and the cosine wave signals 1 and 2 exhibit signal waveforms as shown in FIG. 10. The angle detector 2 normally outputs the sine wave signal 1 until the phase reaches 60°, but the sine wave signal 1 becomes 5 V when the phase exceeds 60°, and this state is maintained as it is. The sum signal Sin_sum1 at this time is as shown in FIG. 11. The sum signal Sin_sum1 is constant at 5 V at the time of the normal state as indicated by an offset monitor value 2, but fluctuates in a range of from 5.5 V to 9.5 V as indicated by an offset monitor value 1 after the failure. Therefore, the failure can be determined with use of the failure determination 1 when the upper limit threshold value Thh1 of the failure determination 1 is set to a value smaller than 5.5 V.

Figure 12:
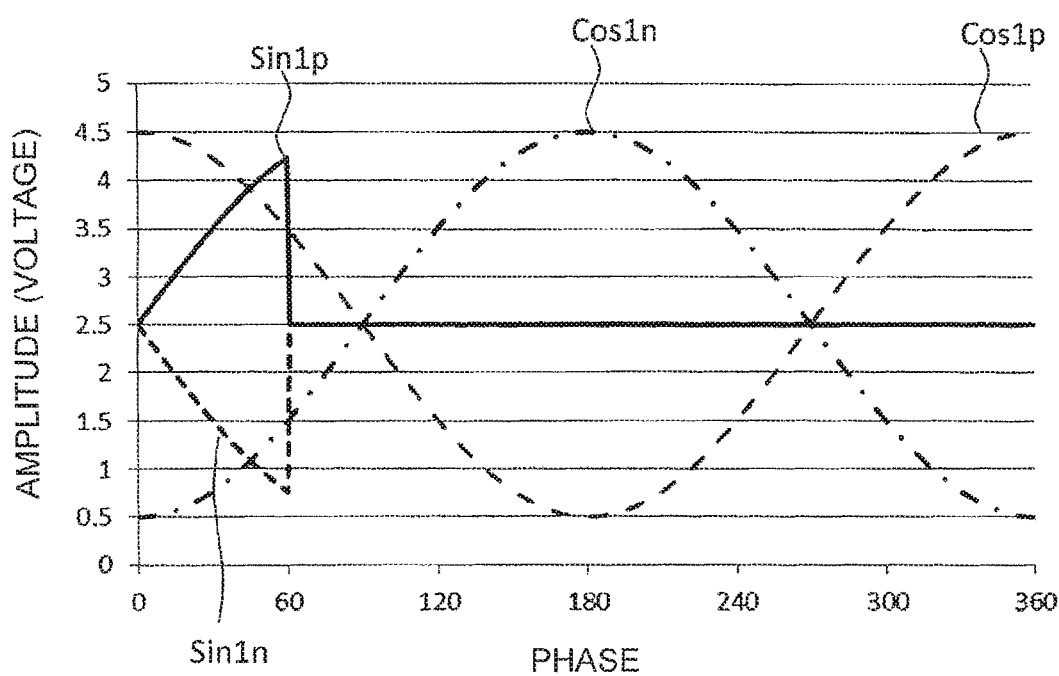
FIG. 12 is a graph for showing signal waveforms of the sine wave signals and the cosine wave signals at the time when the sine wave signal 1 and a sine wave signal 2 are both fixed to 2.5 V in the failure determination of the failure determination device according to the first embodiment of the present invention.
Figure 13:
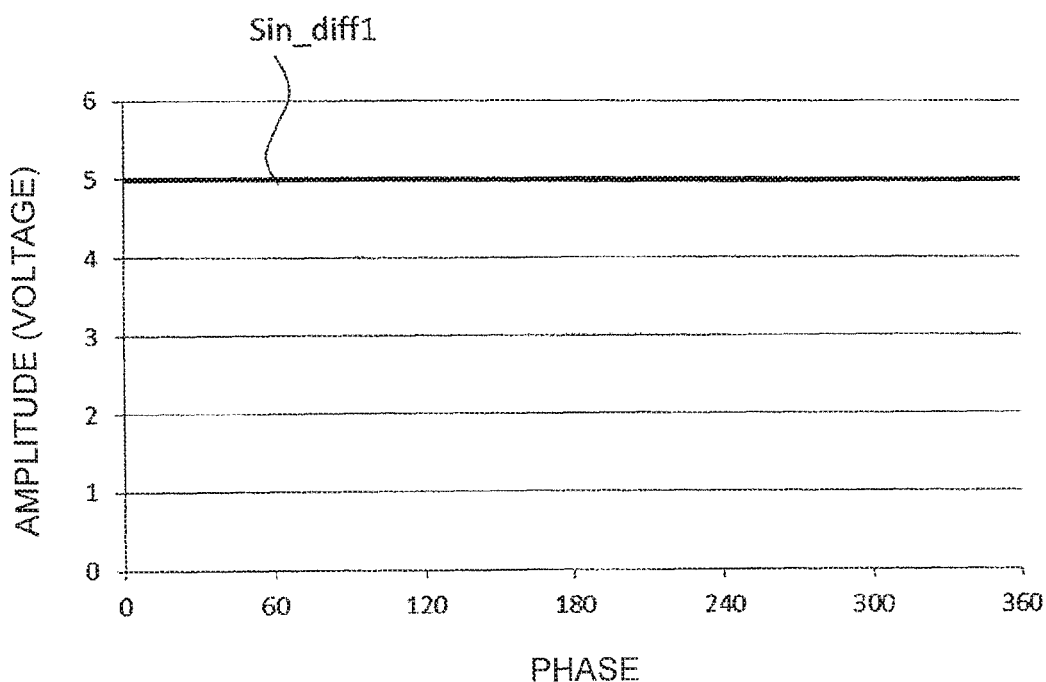
FIG. 13 is a graph for showing a signal waveform of the sum signal at the time when the sine wave signal 1 and the sine wave signal 2 are both fixed to 2.5 V in the failure determination of the failure determination device according to the first embodiment of the present invention.

When the sine wave signal 1 (Sin 1p) and the sine wave signal 2 (Sin 1n) are both fixed to 2.5 V while the rotating machine 1 is rotating, the respective sine wave signals and cosine wave signals exhibit signal waveforms as shown in FIG. 12. The angle detector 2 can normally output the sine wave signals 1 and 2 until the phase reaches 60°, but the sine wave signal 1 and the sine wave signal 2 both become 2.5 V when the phase exceeds 60°, and this state is maintained as it is. The sum signal Sin_sum1 at this time is as shown in FIG. 13. The sum signal Sin_sum1 is constant at 5 V both at the time of the normal state and after the failure, and hence the failure cannot be determined with use of the failure determination 1.

Figure 14:
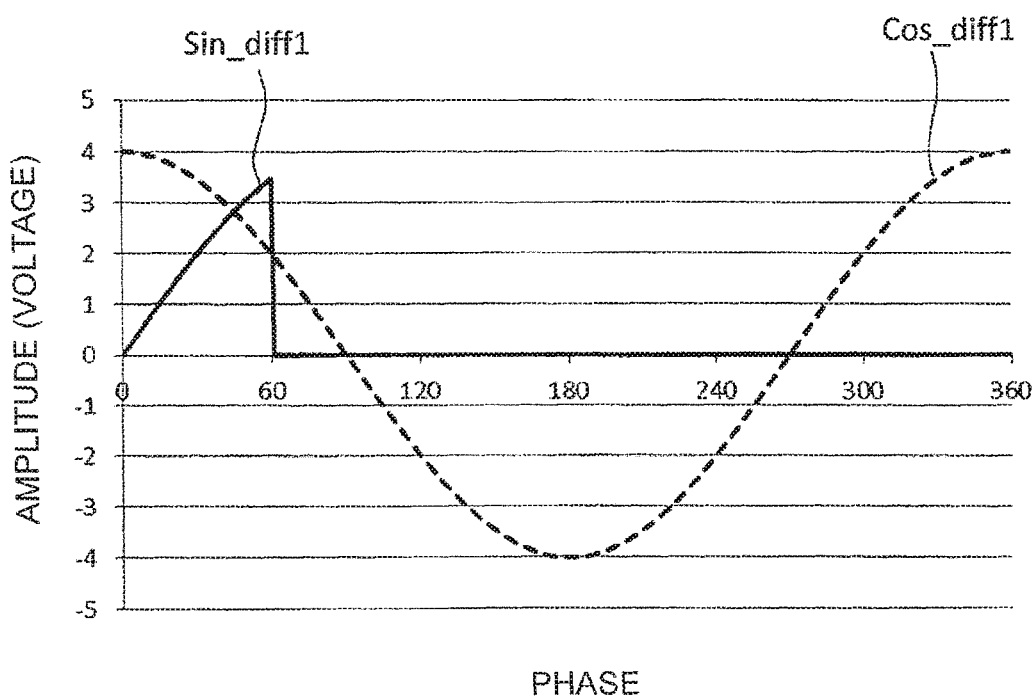
FIG. 14 is a graph for showing signal waveforms of difference signals at the time when the sine wave signal 1 and the sine wave signal 2 are both fixed to 2.5 V in the failure determination of the failure determination device according to the first embodiment of the present invention.

The failure determination 2 is applied to such a failure mode. The difference signal Sin_diff1 obtained by subtracting the sine wave signal 2 from the sine wave signal 1 and the difference signal Cos_diff1 obtained by subtracting the cosine wave signal 2 from the cosine wave signal 1 of Expression (1) exhibit waveforms as shown in FIG. 14.

Figure 15:
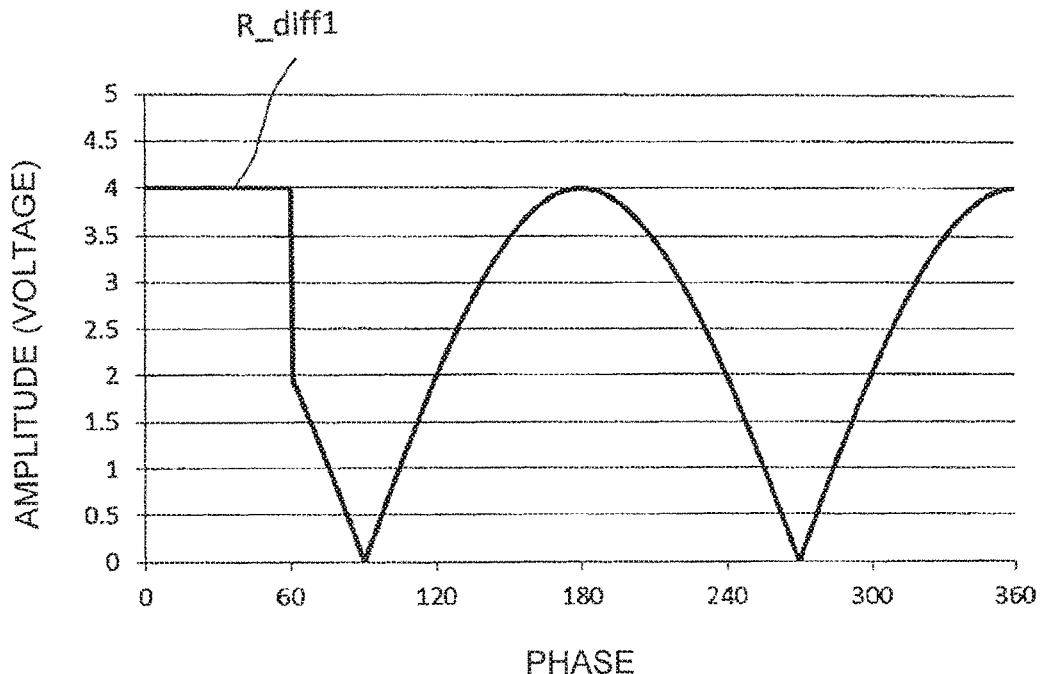
FIG. 15 is a graph for showing a signal waveform of a square root of a sum of squares at the time when the sine wave signal 1 and the sine wave signal 2 are both fixed to 2.5 V in the failure determination of the failure determination device according to the first embodiment of the present invention.

Normal output is obtained until the phase reaches 60°, but the signal becomes 0 V when the phase exceeds 60°, and this state is maintained. The square root R_diff1 of the sum of the squares at this time is as shown in FIG. 15. The square root R_diff1 of the sum of the squares is constant at 4 V at the time of the normal state, but fluctuates in a range of from 0 V to 4 V after the failure at the phase of 60°.

Figure 7:
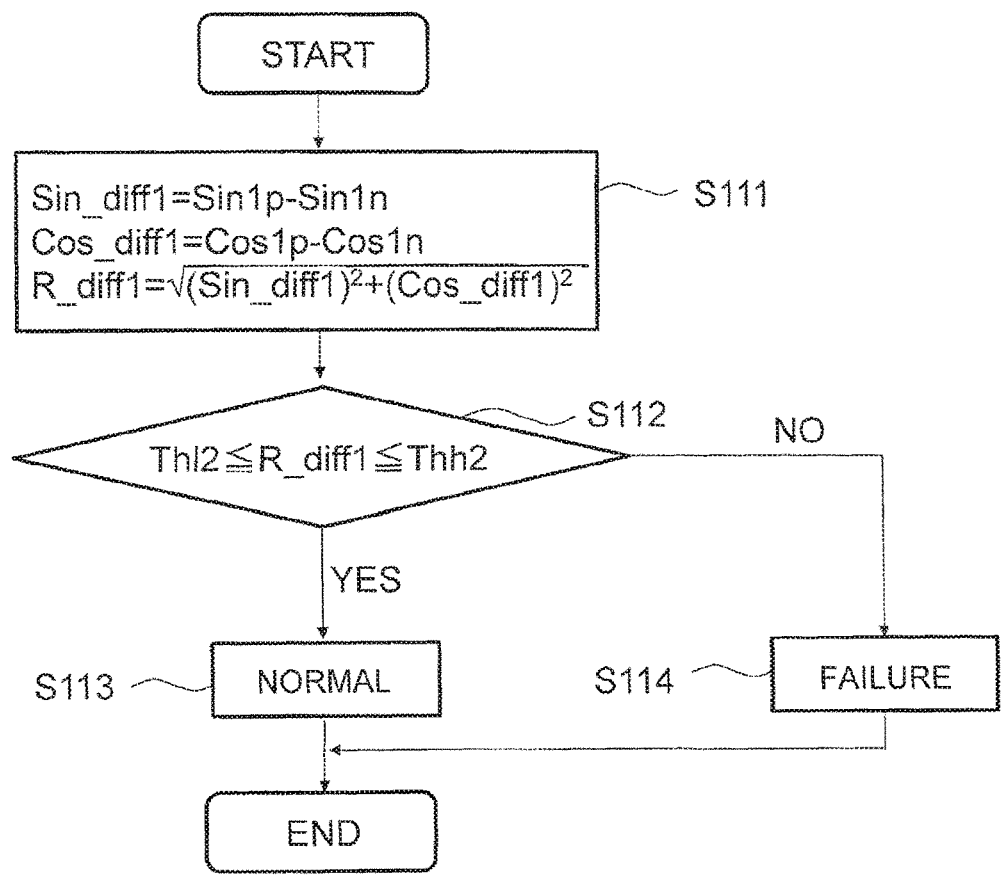
FIG. 7 is a flow chart for illustrating an example of a processing operation of failure determination 2 in the failure determiner of the failure determination device according to the first embodiment of the present invention.

In the failure determination 2, as an example, failure is determined based on the processing illustrated in the flow chart of FIG. 7.

In Step S111, the following steps are performed:
obtaining the difference signal Sin_diff1 from the difference between the sine wave signal 1 and the sine wave signal 2;
obtaining the difference signal Cos_diff1 from the difference between the cosine wave signal 1 and the cosine wave signal 2; and
calculating the square root R_diff1 of the sum of the squares from the difference signal Sin_diff1 and the difference signal Cos_diff1 (R_diff1=$\sqrt{\{(Sin\_diff1)^2+(Cos\_diff1)^2\}}$).

In Step S112, it is determined whether or not the square root R_diff1 of the sum of the squares is equal to or larger than the lower limit threshold value Thl2 of the failure determination 2 and equal to or smaller than the upper limit threshold value Thh2 of the failure determination 2; provided that Thl2<Thh2.

When the above-mentioned condition is satisfied (YES), the normal state is determined in Step S113, and when the above-mentioned condition is not satisfied (NO), the failure is determined in Step S114.

Therefore, when the lower limit threshold value Thl2 is set to 2 V or more, the failure can be determined with use of the failure determination 2 when the phase exceeds 60c to enter the failure state. In this case, the determination is made with use of the square root of the sum of the squares, but, needless to say, a similar effect can be obtained even when the determination is made with use of the sum of the squares $\{(Sin\_diff1)^2+(Cos\_diff1)^2\}$.

That is, by using the failure determination 1 to detect a large number of failure modes and limiting the failure mode to be detected with use of the failure determination 2, the determination threshold value of the failure determination 2 can be determined without being restricted to a small range of 4.9%, which is determined based on the number of pole pairs. That is, in consideration of variation factors such as circuit variations, temperature change, and secular change, the following values are determined:
the lower limit threshold value Thl1 of the failure determination 1;
the upper limit threshold value Thh1 of the failure determination 1;
the lower limit threshold value Thl2 of the failure determination 2; and
the upper limit threshold value Thh2 of the failure determination 2.

Through the determination of the failure with use of any one of the failure determination 1 and the failure determination 2, such an effect that is not provided in the related art that the failure of the angle detector 2 can be determined can be obtained.

The failure determination 1 and the failure determination 2 may always be executed to determine that the angle detector 2 is out of order when the failure is determined in any one of the failure determination 1 and the failure determination 2, but a large number of failure modes are detected with use of the failure determination 1, and hence, in order to reduce the frequency of failure determination to reduce the processing load, the failure determination 1 may be set as main determination and the failure determination 2 may be set as sub-determination to execute the failure determination 2 only when the failure cannot be detected in the failure determination 1.

The failure determination 2 is effective when there is a fear that the sine wave signal 1 and the sine wave signal 2, and the cosine wave signal 1 and the cosine wave signal 2 are fixed to substantially the same value. Therefore, the failure determination 2 may be executed when the difference signal (Sin_diff1) between the sine wave signal 1 and the sine wave signal 2 is smaller than a failure determination selection threshold value ThlS set in advance, or when the difference signal (Cos_diff1) between the cosine wave signal 1 and the cosine wave signal 2 is smaller than the above-mentioned failure determination selection threshold value ThlS.

Further, the failure determination 2 may be executed when the sine wave signal 1 and the sine wave signal 2 have the same value and the difference signal (Sin_diff1) is 0, or when the cosine wave signal 1 and the cosine wave signal 2 have the same value and the difference signal (Cos_diff1) is 0.

The failure in which the signals are fixed to substantially the same value, which cannot be determined with use of the failure determination 1, can be detected with use of the failure determination 2, and thus such an effect that is not provided in the related art that the failure detection accuracy can be improved can be obtained.

Further, in the failure determination 2, the failure is detected with use of the difference signal Sin_diff1 and the difference signal Cos_diff1, but, needless to say, a similar effect can be obtained even when the sine wave signal 1 Sin 1p or the sine wave signal 2 Sin 1n is used instead of the difference signal Sin_diff1 and when the cosine wave signal 1 Cos 1p or the cosine wave signal 2 Cos 1n is used instead of the difference signal Cos_diff1. When the reference values of Sin 1p, Sin 1n, Cos 1p, and Cost n are greatly deviated from 0 V as shown in FIG. 2, a similar effect can be obtained by subtracting a value corresponding to the offset voltage in advance, and then calculating the sum of squares or the square root of the sum of the squares.

Further, in the description above, the number of angle detectors 2 is 1, but as indicated by the broken lines in FIG. 1, a plurality of angle detectors 2 may include angle detectors 2a and 2b. The number of angle detectors is not limited to 2. In the configuration having a plurality of angle detectors, when the failure determiner 4 determines that an angle detector used for calculation of the rotation angle at the time of the normal state is out of order, the angle calculator 3 calculates the rotation angle with use of signals from an angle detector that is not out of order. In this manner, the rotating machine can be controlled as in the case of the normal state.

Second Embodiment

In the above-mentioned first embodiment, in the failure determination 1, the sum signal Sin_sum1 and the sum signal Cos_sum1 are compared with the lower limit threshold value Thl1 and the upper limit threshold value Thh1 of the failure determination 1 to determine the normal state or the failure. However, FIG. 3 represents an ideal state, and the detection value deviates from an ideal value even in an initial state. In a second embodiment of the present invention, the failure determination 1 is executed while considering the deviation amount in the initial state. Thus, setting ranges of the upper and lower limit threshold values are prevented from being enlarged unnecessarily.

Order component errors are superimposed on the sine wave signals and the cosine wave signals, and hence, for example, Expression (2) can be given. In Expression (2), only components up to second-order components are shown, but the signals may include components having higher orders.

$$\begin{cases} \text{Cos}1p = a_{p0} + a_{p1}\cos\theta_s + b_{p1}\sin\theta_s + a_{p2}\cos2\theta_s + b_{p2}\sin2\theta_s \\ \text{Cos}1n = a_{n0} + a_{n1}\cos\theta_s + b_{n1}\sin\theta_s + a_{n2}\cos2\theta_s + b_{n2}\sin2\theta_s \\ \text{Sin}1p = c_{p0} + c_{p1}\cos\theta_s + d_{p1}\sin\theta_s + c_{p2}\cos2\theta_s + d_{p2}\sin2\theta_s \\ \text{Sin}1n = c_{n0} + c_{n1}\cos\theta_s + d_{n1}\sin\theta_s + c_{n2}\cos2\theta_s + d_{n2}\sin2\theta_s \end{cases} \quad (2)$$

FIG. 3 is a graph for showing a case in which respective coefficients are those given in Expression (3), and Expression (3) is not satisfied from the initial state due to circuit variations.

$$\begin{cases} a_{p0} = a_{n0} = c_{p0} = c_{n0} = 2.5 \\ a_{p1} = a_{n1} = d_{p1} = d_{n1} = 2 \\ b_{p1} = a_{p2} = b_{p2} = b_{n1} = a_{n2} = b_{n2} = 0 \\ c_{p1} = c_{p2} = d_{p2} = c_{n1} = c_{n2} = d_{n2} = 0 \end{cases} \quad (3)$$

For example, when the offset is deviated, for example, values as expressed in Expression (4) are taken. In this case, in the initial state, the sum signal Sin_sum1 is 4.9 V, and the sum signal Cos_sum1 is 4.9 V. The values are decreased by 0.1 V from the ideal value, and when the failure determination 1 is executed in the flow chart of FIG. 4, the margin to the upper limit threshold value Thh1 is increased by 0.1 V, but the margin to the lower limit threshold value Thl1 is decreased by 0.1 V. The upper and lower limit threshold values are set while taking those margins into consideration in the first embodiment, but the upper and lower limit threshold values are preferred to have a smaller width in order to improve the accuracy of failure determination.

$$\begin{cases} a_{p0} = c_{p0} = 2.4 \\ a_{n0} = c_{n0} = 2.5 \\ a_{p1} = a_{n1} = d_{p1} = d_{n1} = 2 \\ b_{p1} = a_{p2} = b_{p2} = b_{n1} = a_{n2} = b_{n2} = 0 \\ c_{p1} = c_{p2} = d_{p2} = c_{n1} = c_{n2} = d_{n2} = 0 \end{cases} \quad (4)$$

Figure 16:
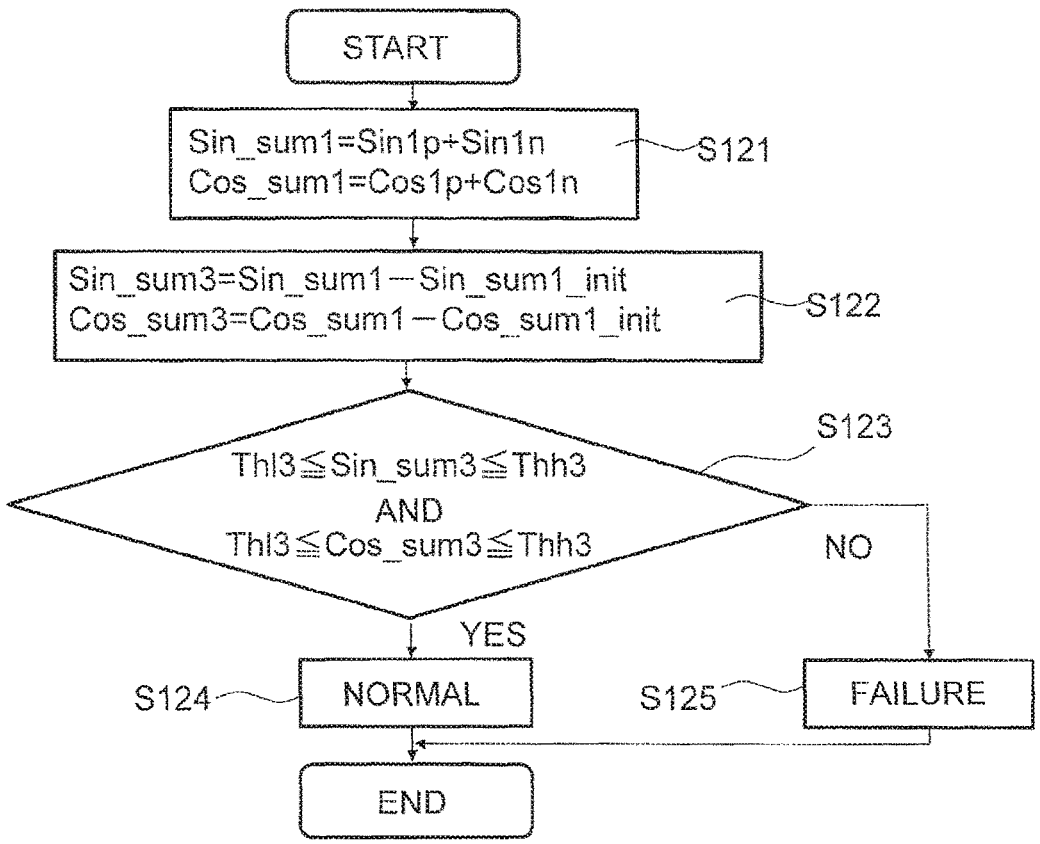
FIG. 16 is a flow chart for illustrating an example of a processing operation of failure determination 1 in a failure determiner of a failure determination device according to a second embodiment of the present invention.

In the second embodiment, in the failure determination 1 of the failure determiner 4; the failure is determined based on the processing illustrated in the flow chart of FIG. 16 as an example.

In Step S121, Sin_sum1 and Cos_sum1 are calculated from the sum of the sine wave signals and the sum of the cosine wave signals, respectively.

In Step S122, the following steps are performed:
calculating; regarding the sine wave signal; a deviation Sin_sum3 between the calculated sum signal Sin_sum1 of the sine wave signals and an initial reference value Sin_sum1_init obtained in advance; and
calculating, regarding the cosine wave signal; a deviation Cos_sum3 between the calculated sum signal Cos_sum1 of the cosine wave signals and an initial reference value Cos_sum1_init obtained in advance.

In Step S123, it is determined whether or not the deviation Sin_sum3 is equal to or larger than a lower limit threshold value Thl3 of the failure determination 1 and equal to or smaller than an upper limit threshold value Thh3 of the failure determination 1; and the deviation Cos_sum3 is equal to or larger than the lower limit threshold value Thl3 and equal to or smaller than the upper limit threshold value Thh3; provided that Thl3<Thh3.

When the above-mentioned condition is satisfied (YES), the normal state is determined in Step S124, and when the above-mentioned condition is not satisfied (NO), the failure is determined in Step S125.

The initial reference value Sin_sum1_init is only required to be a reference value, and may be obtained by, for example, the following methods:
averaging values of the calculated sum signal Sin_sum1 corresponding to one period of the rotation angle;
setting a zero-order component of a result of fast Fourier transform (FFT) of the calculated sum signal Sin_sum1 as the initial reference value; and
setting the calculated sum signal Sin_sum1 at the rotation angle of 0° as the initial reference value.

The initial reference value Cos_sum1_init is also only required to be a reference value, and may be obtained by, for example, the following methods:
averaging values of the calculated sum signal Cos_sum1 corresponding to one period of the rotation angle;
setting a zero-order component of a result of fast Fourier transform (FFT) of the calculated sum signal Cos_sum1 as the initial reference value; and
setting the calculated sum signal Cos_sum1 at the rotation angle of 90° as the initial reference value.

The obtained initial reference values Sin_sum1_init and Cos_sum1_init are, for example, stored in the memory 103 of the computer 100 illustrated in FIG. 21 to be used.

That is, the deviation from the initial value is compared with each of the upper and lower limit threshold values, and hence the amount of the offset error already included in the initial state is not required to be considered when the upper and lower limit threshold values are set, and the change amounts relating to mainly the temperature change and the secular change are only required to be considered.

In the above-mentioned example, description is given of the offset, but when the two signals for which the sum is calculated have an amplitude deviation or a phase difference deviation, the initial value deviates from the ideal value; and hence a similar effect is obtained by determining the failure in the procedure of FIG. 16.

Third Embodiment

In the above-mentioned second embodiment, in the failure determination 1, the deviation Sin_sum3 and the deviation Cos_sum3 are compared with the lower limit threshold value Thl3 and the upper limit threshold value Thh3 to determine the normal state or the failure. However, FIG. 6 represents an ideal state, and the detection value deviates from an ideal value even in an initial state. In a third embodiment of the present invention, the failure determination 2 is executed while considering the deviation amount in the initial state. Thus, setting ranges of the upper and lower limit threshold values are prevented from being enlarged unnecessarily.

FIG. 6 is a graph for showing a case in which respective coefficients are those given in Expression (3), and Expression (3) is not satisfied from the initial state due to circuit variations. For example, when the amplitude is deviated, for example, values as expressed in Expression (5) are taken. In this case, in the initial state, the square root R_diff1 of the sum of the squares is 4.2 V. The values are increased by 0.2 V from the ideal value, and when the failure determination 2 is executed in the flow chart of FIG. 7, the margin to the lower limit threshold value Thl2 is increased by 0.2 V, but the margin to the upper limit threshold value Thh2 is decreased by 0.2 V. The upper and lower limit threshold values are set while taking those margins into consideration in the first embodiment, but the upper and lower limit threshold values are preferred to have a smaller width in order to improve the accuracy of failure determination.

$$\begin{cases} a_{p0} = a_{n0} = c_{p0} = c_{n0} = 2.5 \\ a_{p1} = d_{p1} = 2.2 \\ a_{n1} = d_{n1} = 2 \\ b_{p1} = a_{p2} = b_{p2} = b_{n1} = a_{n2} = b_{n2} = 0 \\ c_{p1} = c_{p2} = d_{p2} = c_{n1} = c_{n2} = d_{n2} = 0 \end{cases} \quad (5)$$

Figure 17:
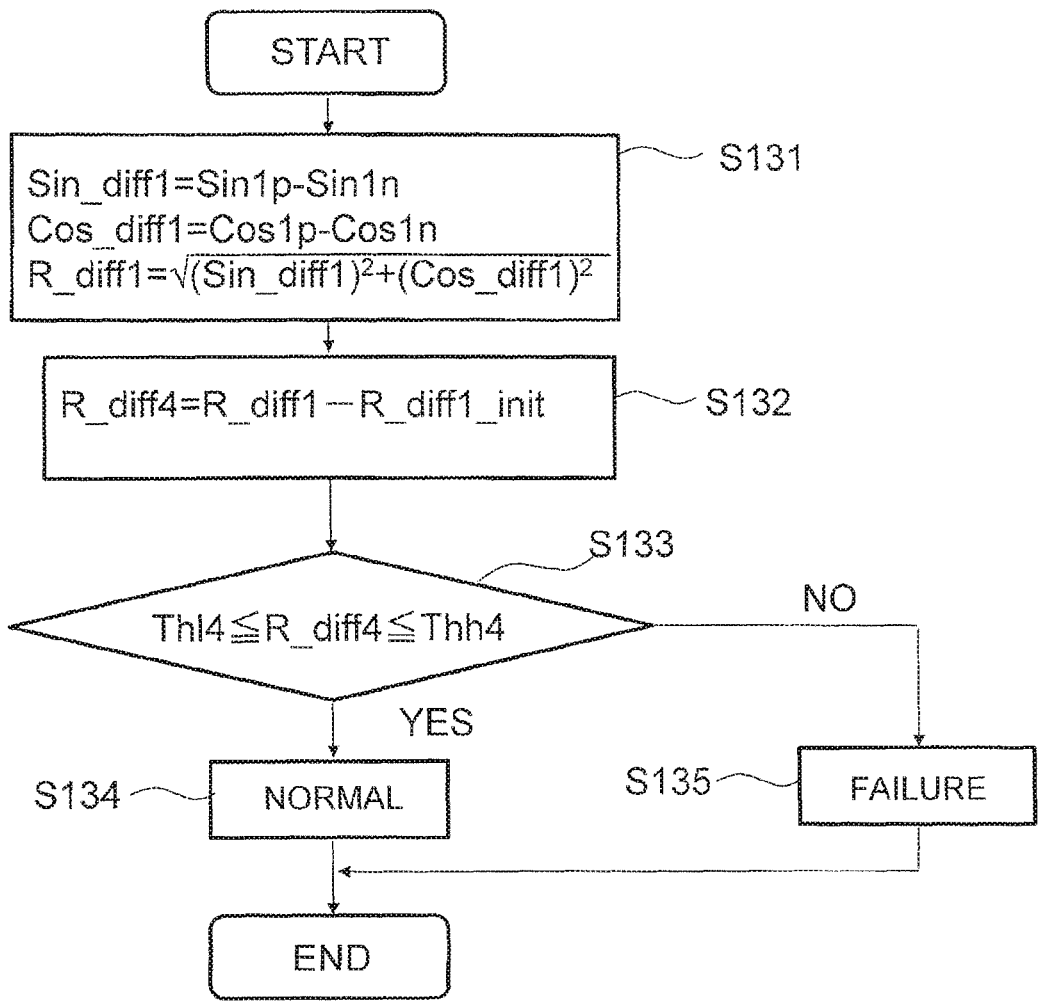
FIG. 17 is a flow chart for illustrating an example of a processing operation of failure determination 2 in a failure determiner of a failure determination device according to a third embodiment of the present invention.

In the third embodiment, in the failure determination 2 of the failure determiner 4, the failure is determined based on the processing illustrated in the flow chart of FIG. 17 as an example.

In Step S131, the following steps are performed:

obtaining the difference signal Sin_diff1 from the difference between the sine wave signal 1 and the sine wave signal 2;

obtaining the difference signal Cos_diff1 from the difference between the cosine wave signal 1 and the cosine wave signal 2; and calculating the square root R_diff1 of the sum of the squares from the difference signal Sin_diff1 and the difference signal Cos_diff1 (R_diff1=$\sqrt{\{(Sin\_diff1)^2+(Cos\_diff1)^2\}}$).

In Step S132, a deviation R_diff4 between the calculated square root R_diff1 of the sum of the squares and an initial reference value R_diff1_init obtained in advance is calculated.

In Step S133, it is determined whether or not the deviation R_diff4 is equal to or larger than a lower limit threshold value Thl4 of the failure determination 2 and equal to or smaller than an upper limit threshold value Thh4 of the failure determination 2, provided that Thl4<Thh4.

When the above-mentioned condition is satisfied (YES), the normal state is determined in Step S134, and when the above-mentioned condition is not satisfied (NO), the failure is determined in Step S135.

The initial reference value R_diff1_init is only required to be a reference value, and may be obtained by, for example, the following methods:

averaging values of the calculated square root R_diff1 of the sum of the squares corresponding to one period of the rotation angle;

setting a zero-order component of a result of fast Fourier transform (FFT) of the calculated square root R_diff1 of the sum of the squares as the initial reference value; and setting the calculated square root R_diff1 of the sum of the squares at the rotation angle of 0° as the initial reference value.

The obtained initial reference value R_diff1_init is, for example, stored in the memory 103 of the computer 100 illustrated in FIG. 21 to be used.

That is, the deviation from the initial value is compared with each of the upper and lower limit threshold values, and hence the amount of the amplitude error already included in the initial state is not required to be considered when the upper and lower limit threshold values are set, and the change amount relating to mainly the temperature change and the secular change is only required to be considered.

In the above-mentioned example, description is given of the amplitude, but when the two signals for which the difference is calculated have an offset or a phase difference deviation, although the initial value deviates from the ideal value, a similar effect is obtained by determining the failure in the procedure of FIG. 17.

In the present invention, the failure determination device for an angle detector for a rotating machine basically includes the angle detector 2, 2a, or 2b, and the failure determiner 4 of FIG. 1. Further, an angle detection device for a rotating machine includes the angle detector 2, 2a; or 2b, the failure determiner 4, and the angle calculator 3.

Further, in the failure determination device for an angle detector for a rotating machine described above; the failure determiner 4 performs all calculations by itself; but the results of calculations of, for example, the difference signals Sin_diff1 and Cos_diff1 may be shared with the angle calculator 3. In this case; the failure determination device also includes the angle calculator 3.

As described above, according to the present invention; there is provided a failure determination device for an angle detector for a rotating machine, the failure determination device including: an angle detector, which includes n pole pairs (n is a natural number that is smaller than m), and is configured to output a sine wave signal and a cosine wave signal in accordance with a rotational position of a rotating machine including a multi-phase winding and m pole pairs (m is a natural number of 2 or more); and a failure determiner configured to determine failure of the angle detector based on signals from the angle detector. The angle detector is configured to output the sine wave signal including a first sine wave signal and a second sine wave signal having a phase that is different by 180° from a phase of the first sine wave signal, and the cosine wave signal including a first cosine wave signal and a second cosine wave signal having a phase that is different by 180° from a phase of the first cosine wave signal. The failure determiner is configured to determine that the angle detector is out of order when the failure is determined with use of at least one of: first failure determination using a sum of the first sine wave signal and the second sine wave signal and a sum of the first cosine wave signal and the second cosine wave signal; or second failure determination using a sum of squares or a square root of a sum of squares of the sine wave signal and the cosine wave signal.

In this manner, the failure is determined by an offset monitor based on a signal sum or a Lissajous based on a sum of squares. Thus, even in the case of m>n, a failure detection accuracy that is equivalent to that in the case of m=n can be obtained.

Further, the failure determiner is configured to determine the failure with use of the second failure determination when failure has failed to be determined in the first failure determination, In this manner, the failure is determined by the offset monitor (main) and the Lissajous (sub).

Further, the first failure determination includes determining the failure with use of a deviation from an initial value of each of the sum of the first sine wave signal and the second sine wave signal and the sum of the first cosine wave signal and the second cosine wave signal.

In this manner, with use of the initial value, the threshold value can be set with a small margin, and the determination is made with the deviation from the initial state being omitted. As a result, an accuracy of a failure range can be increased.

Further, the second failure determination includes determining the failure with use of a deviation from an initial value of the sum of the squares or the square root of the sum of the squares of the sine wave signal and the cosine wave signal.

In this manner, with use of the initial value, the threshold value can be set with a small margin, and the determination is made with the deviation from the initial state being omitted. As a result, an accuracy of a failure range can be increased.

Further, the second failure determination includes determining the failure with use of a sum of squares or a square root of a sum of squares of a difference between the first sine wave signal and the second sine wave signal and a difference between the first cosine wave signal and the second cosine wave signal.

In this manner, with use of the difference, the change due to the temperature characteristic can be canceled, and the threshold value can be set with a small margin. As a result, an accuracy of a failure range can be increased.

Further, the failure determiner is configured to use the second failure determination at time of the failure in which a difference between the first sine wave signal and the second sine wave signal is smaller than a failure determination threshold value, or at time of the failure in which a difference between the first cosine wave signal and the second cosine wave signal is smaller than the failure determination threshold value.

In this manner, when there is a fear that fixation to the same value occurs due to short-circuit of a signal pair to an adjacent terminal, determination based on a Lissajous is used to improve the failure detection accuracy.

Further, the failure determiner is configured to use the second failure determination at time of the failure in which the first sine wave signal and the second sine wave signal have the same value, or at time of the failure in which the first cosine wave signal and the second cosine wave signal have the same value.

In this manner, when fixation to the same value occurs due to short-circuit of a signal pair to an adjacent terminal, determination based on a Lissajous is used to improve the failure detection accuracy.

Further, there is provided an angle detection device for a rotating machine, the angle detection device including: the above-mentioned failure determination device; and an angle calculator configured to calculate a rotation angle of the rotating machine based on signals from the angle detector. The angle detector includes a plurality of angle detectors. When the failure determiner determines that one of the plurality of angle detectors used for calculation of the rotation angle is out of order, the angle calculator calculates the rotation angle with use of signals from another one of the plurality of angle detectors that is not out of order.

In this manner, even when one angle detector is out of order, the rotation angle can be calculated based on signals from a normal angle detector.

Further, there is provided a failure determination method for an angle detector for a rotating machine, the failure determination method including: calculating a rotation angle based on signals from an angle detector, which includes n pole pairs (n is a natural number that is smaller than m), and is configured to output a sine wave signal and a cosine wave signal in accordance with a rotational position of a rotating machine including a multi-phase winding and m pole pairs (m is a natural number of 2 or more); determining failure of the angle detector based on the signals from the angle detector, the angle detector being configured to output the sine wave signal including a first sine wave signal and a second sine wave signal having a phase that is different by 180° from a phase of the first sine wave signal, and the cosine wave signal including a first cosine wave signal and a second cosine wave signal having a phase that is different by 180° from a phase of the first cosine wave signal; and determining that the angle detector is out of order when the failure is determined with use of at least one of: first failure determination using a sum of the first sine wave signal and the second sine wave signal and a sum of the first cosine wave signal and the second cosine wave signal; or second failure determination using a sum of squares or a square root of a sum of squares of the sine wave signal and the cosine wave signal.

In this manner, the failure is determined by an offset monitor based on a signal sum or a Lissajous based on a sum of squares. Thus, even in the case of m>n, a failure detection accuracy that is equivalent to that in the case of m=n can be obtained.

INDUSTRIAL APPLICABILITY

The failure determination device and method for an angle detector for a rotating machine and the like according to the present invention can be applied to failure determination for an angle detector for a rotating machine of various fields.

The invention claimed is:

1. A failure determination device for an angle detector for a rotating machine, the failure determination device comprising:
an angle detector, which includes n pole pairs (n is a natural number that is smaller than m), and outputs a sine wave signal and a cosine wave signal in accordance with a rotational position of a rotating machine including a multi-phase winding and m pole pairs (m is a natural number of 2 or more); and
a failure determiner to determine failure of the angle detector based on signals from the angle detector,
wherein the angle detector outputs the sine wave signal including a first sine wave signal and a second sine wave signal having a phase that is different by 180° from a phase of the first sine wave signal, and the cosine wave signal including a first cosine wave signal and a second cosine wave signal having a phase that is different by 180° from a phase of the first cosine wave signal, and
wherein the failure determiner is configured to determine that the angle detector has failed using:
a first failure determination using a sum of the first sine wave signal and the second sine wave signal and a sum of the first cosine wave signal and the second cosine wave signal; and
a second failure determination using a sum of squares or a square root of a sum of squares of the sine wave signals and the cosine wave signals,
wherein the failure determiner determines the failure with use of the second failure determination in response to the first failure determination not determining a failure.

2. The failure determination device for an angle detector for a rotating machine according to claim 1, wherein the first failure determination includes determining the failure with use of a deviation from an initial value of each of the sum of the first sine wave signal and the second sine wave signal and the sum of the first cosine wave signal and the second cosine wave signal.

3. The failure determination device for an angle detector for a rotating machine according to claim 1, wherein the second failure determination includes determining the failure with use of a deviation from an initial value of the sum of the squares or the square root of the sum of the squares of the sine wave signals and the cosine wave signals.

4. The failure determination device for an angle detector for a rotating machine according to claim 1, wherein the second failure determination includes determining the failure with use of a sum of squares or a square root of a sum of squares of a difference between the first sine wave signal and the second sine wave signal and a difference between the first cosine wave signal and the second cosine wave signal.

5. The failure determination device for an angle detector for a rotating machine according to claim 1, wherein the failure determiner uses the second failure determination at time of the failure in which a difference between the first sine wave signal and the second sine wave signal is smaller than a failure determination threshold value, or at time of the failure in which a difference between the first cosine wave signal and the second cosine wave signal is smaller than the failure determination threshold value.

6. The failure determination device for an angle detector for a rotating machine according to claim 1, wherein the failure determiner uses the second failure determination at time of the failure in which the first sine wave signal and the second sine wave signal have the same value, or at time of the failure in which the first cosine wave signal and the second cosine wave signal have the same value.

7. An angle detection device for a rotating machine, the angle detection device comprising:
the failure determination device for an angle detector for a rotating machine of claim 1; and
an angle calculator to calculate a rotation angle of the rotating machine based on signals from the angle detector,
wherein the angle detector includes a plurality of angle detectors, and
wherein, when the failure determiner determines that one of the plurality of angle detectors used for calculation of the rotation angle is out of order, the angle calculator calculates the rotation angle with use of signals from another one of the plurality of angle detectors that is not out of order.

8. The failure determination device for an angle detector for a rotating machine according to claim 2, wherein the second failure determination includes determining the failure with use of a deviation from an initial value of the sum of the squares or the square root of the sum of the squares of the sine wave signals and the cosine wave signals.

9. The failure determination device for an angle detector for a rotating machine according to claim 2, wherein the second failure determination includes determining the failure with use of a sum of squares or a square root of a sum of squares of a difference between the first sine wave signal and the second sine wave signal and a difference between the first cosine wave signal and the second cosine wave signal.

10. The failure determination device for an angle detector for a rotating machine according to claim 2, wherein the failure determiner uses the second failure determination at time of the failure in which a difference between the first sine wave signal and the second sine wave signal is smaller than a failure determination threshold value, or at time of the failure in which a difference between the first cosine wave signal and the second cosine wave signal is smaller than the failure determination threshold value.

11. The failure determination device for an angle detector for a rotating machine according to claim 2, wherein the failure determiner uses the second failure determination at time of the failure in which the first sine wave signal and the second sine wave signal have the same value, or at time of the failure in which the first cosine wave signal and the second cosine wave signal have the same value.

12. A failure determination method for an angle detector for a rotating machine, the failure determination method comprising:
calculating a rotation angle based on signals from an angle detector, which includes n pole pairs (n is a natural number that is smaller than m), and outputs a sine wave signal and a cosine wave signal in accordance with a rotational position of a rotating machine including a multi-phase winding and m pole pairs (m is a natural number of 2 or more);
determining failure of the angle detector based on the signals from the angle detector, the angle detector outputting the sine wave signal including a first sine wave signal and a second sine wave signal having a phase that is different by 180° from a phase of the first sine wave signal, and the cosine wave signal including a first cosine wave signal and a second cosine wave signal having a phase that is different by 180° from a phase of the first cosine wave signal; and
determining that the angle detector has failed using:
a first failure determination using a sum of the first sine wave signal and the second sine wave signal and a sum of the first cosine wave signal and the second cosine wave signal; and
a second failure determination using a sum of squares or a square root of a sum of squares of the sine wave signals and the cosine wave signals,
wherein the failure is determined with use of the second failure determination in response to the first failure determination not determining a failure.

\* \* \* \* \*